United States Patent
Alqahtani et al.

(10) Patent No.: US 12,361,755 B1
(45) Date of Patent: Jul. 15, 2025

(54) FACE IDENTIFICATION SYSTEM AND METHOD FOR IDENTIFYING FACE IMAGE

(71) Applicant: IMAM MOHAMMAD IBN SAUD ISLAMIC UNIVERSITY, Riyadh (SA)

(72) Inventors: Haifa Abdullah Salem Alqahtani, Riyadh (SA); Mohamed Alkhatib, Riyadh (SA)

(73) Assignee: IMAM MOHAMMAD IBN SAUD ISLAMIC UNIVERSITY, Riyadh (SA)

(*) Notice: Subject to any disclaimer, the term of this patent is extended or adjusted under 35 U.S.C. 154(b) by 0 days.

(21) Appl. No.: 18/888,599

(22) Filed: Sep. 18, 2024

(51) Int. Cl.
*H04L 9/08* (2006.01)
*G06V 40/16* (2022.01)
(Continued)

(52) U.S. Cl.
CPC ............ *G06V 40/172* (2022.01); *G06V 40/50* (2022.01); *H04L 9/0869* (2013.01); *H04L 9/3231* (2013.01)

(58) Field of Classification Search
CPC .... G06V 40/172; G06V 40/50; H04L 9/0869; H04L 9/3231
(Continued)

(56) References Cited

U.S. PATENT DOCUMENTS

| | | | | |
|---|---|---|---|---|
| 2013/0251214 A1* | 9/2013 | Chung | ................... | G06Q 10/00 382/116 |
| 2023/0140341 A1* | 5/2023 | Ortiz | ................... | H04L 63/0861 713/186 |
| 2023/0403159 A1* | 12/2023 | Vemury | ............... | G06V 40/172 |

FOREIGN PATENT DOCUMENTS

| | | | | |
|---|---|---|---|---|
| CN | 111105338 A | | 5/2020 | |
| CN | 113411178 B | * | 3/2023 | ............. H04L 9/001 |
| CN | 116886831 A | | 10/2023 | |

OTHER PUBLICATIONS

Eimad Abusham, et al. An iniegration of New Digits! mage Serambling Technique on PCA-Based Face Recognition Syste, Scientific Programming, vol. 2422, Anicie (ID 2828885, Nov. 25, 2022 17 gages (Year: 2022).*

(Continued)

*Primary Examiner* — Sanchit K Sarker
(74) *Attorney, Agent, or Firm* — Oblon, McClelland, Maier & Neustadt, L.L.P.

(57) ABSTRACT

A face identification system, and a non-transitory computer readable medium with instructions, that when executed, perform a method for identifying a face image are described. The face identification system comprises a camera for facial image capture, encryption circuitry for image encryption, feature extraction circuitry for processing encrypted images, a face recognition system for identification, and an identification notifying system for result transmission. The encryption circuitry includes a pixel-bit converter, transforming pixel intensities into binary digits, and a 2D cellular automata function, working with a 3×3 matrix of binary-state cells transitioning by update rules. A gray code generator maps binary numbers to unique gray-scale values. The system integrates advanced encryption techniques with efficient feature extraction and recognition algorithms, addressing challenges in biometric authentication. This approach enhances security, accuracy, and computational efficiency compared to conventional systems, making it suitable for various applications requiring secure and efficient facial recognition.

16 Claims, 12 Drawing Sheets

(51) Int. Cl.
*G06V 40/50* (2022.01)
*H04L 9/32* (2006.01)

(58) Field of Classification Search
USPC .......................................... 713/186; 382/115
See application file for complete search history.

(56) References Cited

OTHER PUBLICATIONS

Eimad Abusham, ef al. An integration of New Digits! mage Scrambling Technique on PCA-Based Face Recognition System, Scientific Programming, vol. 2422, Article (ID 2828885, Nov. 25, 2022 17 pages (Year: 2022).*

Eimad Abusham, et al., "An Integration of New Digital Image Scrambling Technique on PCA-Based Face Recognition System", Scientific Programming, vol. 2022, Article ID 2628885, Nov. 25, 2022, 17 pages.

Eimad Abusham, et al., "Facial Image Encryption for Secure Face Recognition System", Electronics, vol. 12, No. 774, Feb. 3, 2023, 26 pages.

* cited by examiner

FACE IDENTIFICATION SYSTEM AND METHOD FOR IDENTIFYING FACE IMAGE

BACKGROUND

Technical Field

The present disclosure relates to the field of face identification systems. More specifically, the present disclosure pertains to face recognition and authentication systems that employ image encryption, feature extraction, and recognition techniques to enhance security and accuracy in facial identification applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Facial recognition technology has become increasingly prevalent in various applications, including security systems, access control, and personal device authentication. These systems typically capture an image of a person's face, extract relevant features, and compare them against a database of known individuals to establish identity. However, traditional face identification systems often face challenges related to data security, privacy concerns, and vulnerability to impersonation attacks. One significant issue is the vulnerability of facial image data to unauthorized access or interception during storage and transmission. This poses serious privacy and security risks, as compromised facial data could lead to identity theft or other malicious activities. Additionally, many existing systems struggle with accuracy, particularly when dealing with variations in lighting conditions, facial expressions, or camera angles.

Conventional approaches to addressing these concerns have included the use of basic encryption techniques to secure facial image data during storage and transmission. Some systems have also implemented feature extraction methods, including dimensionality reduction techniques, such as principal component analysis (PCA), to reduce the amount of data that needs to be stored or transmitted, thereby minimizing the potential attack surface. However, existing solutions generally fail to provide a comprehensive approach to security and accuracy in face identification systems. Basic encryption methods may be susceptible to cryptographic attacks, while simplistic feature extraction techniques may not capture sufficient detail for accurate recognition. Furthermore, many conventional systems struggle to balance the need for robust security measures with the requirement for efficient processing and real-time performance.

Accordingly, it is one object of the present disclosure to provide a comprehensive face identification system that addresses these limitations. The present disclosure provides a face identification system and a method for identifying a face image for enhanced security for facial image data through advanced encryption techniques, while simultaneously enabling accurate feature extraction and face recognition. The face identification system of the present disclosure is computationally efficient to support real-time applications. By overcoming the challenges faced by conventional systems, the present disclosure provides significant benefits in terms of privacy protection, accuracy, and reliability across a wide range of face recognition and authentication scenarios.

SUMMARY

In an exemplary embodiment, a face identification system is described. The face identification system comprises a camera for capturing an image of a person's face. The face identification system also comprises encryption circuitry configured to encrypt a captured facial image to obtain an encrypted facial image. The face identification system further comprises feature extraction circuitry configured to extract features of the encrypted facial image. The face identification system further comprises a face recognition system configured to identify the face in the facial image using the extracted encrypted features. The face identification system further comprises an identification notifying system for transmitting a notification of the identified face. The encryption circuitry includes a pixel-bit converter configured to transform each pixel intensity into binary digits to obtain a binary format of the facial image. The encryption circuitry also includes a 2D cellular automata function configured to transform the binary format of the facial image to obtain a transformed image. Herein, the 2D cellular automata function works with a 3×3 matrix of cells containing binary numbers, where each binary number is one of two states, the binary numbers are transitioned to next states by update rules. The encryption circuitry further includes a gray code generator configured to map the binary numbers to unique gray-scale values within a specific range to generate a gray code image.

In some embodiments, the face identification system further comprises key generation circuitry configured to generate an encryption key as a chaotic sequence.

In some embodiments, the key generation circuitry is further configured to generate the chaotic sequence using a logistic map of $$x = r*x*(1-x)$$

where x represents a value of the sequence at an iteration n, r is a parameter between 0 and 4, wherein an initial value of x is 0.5 and r is 3.9.

In some embodiments, the key generation circuitry is further configured to generate random strings of characters as the encryption key.

In some embodiments, the encryption circuitry is configured apply an encryption algorithm to the gray code image using the encryption key.

In some embodiments, the feature extraction circuitry is further configured to extract the features using principal component analysis.

In some embodiments, the face recognition system is configured to classify the extracted encrypted image using Euclidean distance as a similarity measure with a database of known facial features associated with specific individuals.

In some embodiments, the 2D cellular automata function uses game of life update rules to transition to next states. Herein, if a cell has a value of 0 at time t, it becomes 1 at time t+1, if exactly three neighbor cells are 1 at time t. If a cell is 1 at time t, it becomes 0 at time t+1, if four or more of its neighbor cells are 1 at time t. If a cell is 1 at time t, it becomes 0 at time t+1 if one or none of its neighbor cells are 1 at time 1. If a cell is 1 at time t, it will remain 1 at time t+1 if two or three of its neighbor cells are 1 at time 1.

In some embodiments, the face recognition system includes an encrypted feature database. The face recognition system is further configured to generate eigenfaces by applying principal component analysis to a dataset of the encrypted feature for face images.

In some embodiments, the face recognition system is further configured to identify a new face image that is projected using principal component analysis.

In some embodiments, the identification notifying system is further configured to transmit a notification that grants or denies access based on the identified face.

In another exemplary embodiment, a non-transitory computer-readable storage medium including computer executable instructions is described. Herein, the instructions, when executed by a computer, cause the computer to perform a method for identifying a face image. The method comprises capturing, by a camera, an image of a person's face to obtain a facial image. The method further comprises encrypting, by encryption circuitry, the captured facial image. The method further comprises extracting, by feature extraction circuitry, features of the encrypted facial image. The method further comprises identifying, by a face recognition system, the face in the facial image using the extracted encrypted features. The method further comprises transmitting, by an identification notifying system, a notification of the identified face. In the method, the encrypting by the encryption circuitry includes transforming each pixel intensity into binary digits to obtain a binary format of the facial image. The encrypting by the encryption circuitry further includes transforming, by 2D cellular automata, the binary format of the facial image to obtain a transformed image. Herein, the 2D cellular automata works with a 3×3 matrix of cells containing binary numbers, where each binary number is one of two states, the binary numbers are transitioned to next states by update rules. The encrypting by the encryption circuitry further includes mapping the binary numbers to unique gray-scale values within a specific range to generate a gray code image.

In some embodiments, the method further comprises generating an encryption key as a chaotic sequence.

In some embodiments, the method further comprises generating the chaotic sequence using a logistic map of $$x=r*x*(1-x)$$

where x represents a value of the sequence at an iteration n, r is a parameter between 0 and 4, wherein an initial value of x is 0.5 and r is 3.9.

In some embodiments, the method further comprises generating random strings of characters as the encryption key.

In some embodiments, the method further comprises applying an encryption algorithm to the gray code image using the encryption key.

In some embodiments, the method further comprises extracting the features using principal component analysis.

In some embodiments, the method further comprises classifying the extracted encrypted image using Euclidean distance as a similarity measure with an encrypted feature database of known facial features associated with specific individuals. Herein, classifying includes generating eigenfaces by applying principal component analysis to a dataset of the encrypted feature for face images.

In some embodiments, the method further comprises identifying a new face image that is projected using principal component analysis.

In some embodiments, the method further comprises transmitting a notification that grants or denies access based on the identified face.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
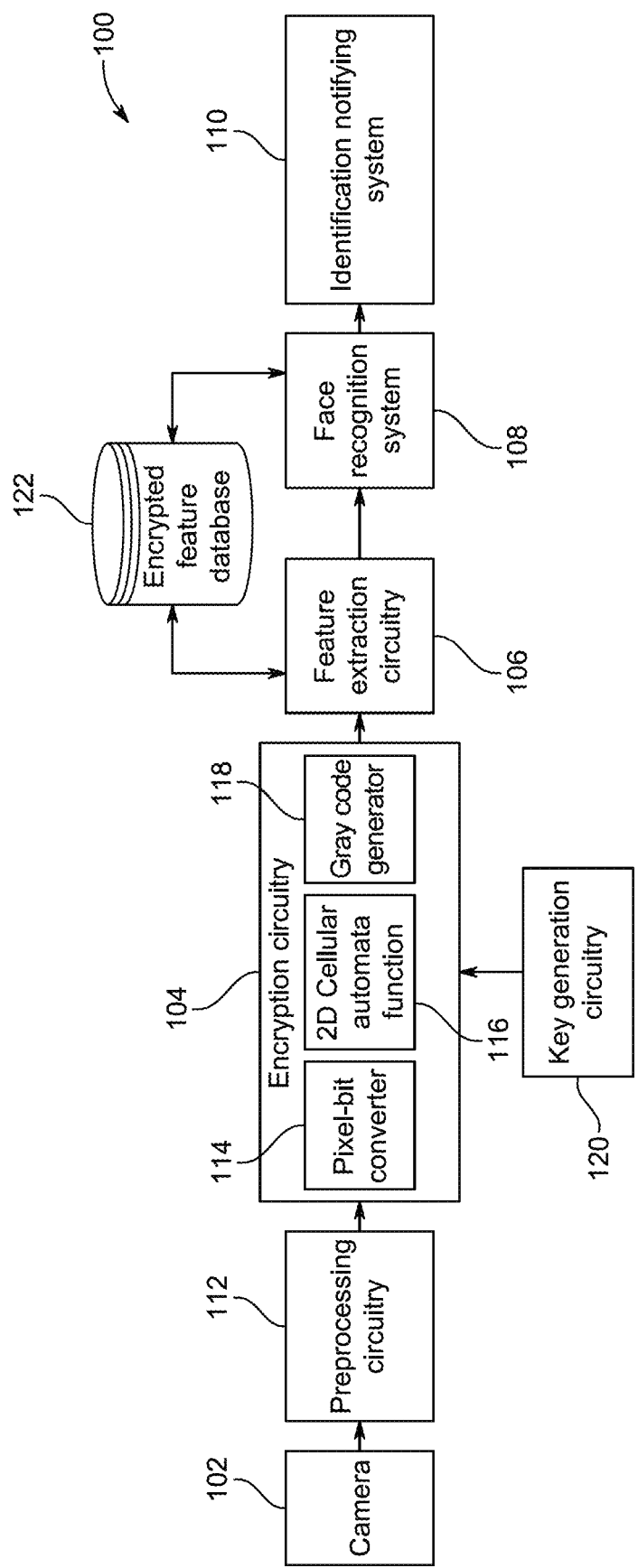
FIG. 1 is an exemplary schematic block diagram illustrating general architecture of a face identification system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a face identification system and a computer-readable storage medium storing a method for identifying a face image which address the aforementioned challenges of the conventional approaches by integrating multi-stage encryption process, which includes pixel-to-binary conversion, cellular automata-based image transformation, and gray code generation. The system also incorporates principal component analysis for dimensionality reduction and employs Euclidean distance measures for accurate face matching. By integrating advanced encryption techniques with efficient feature extraction and recognition algorithms, the present disclosure addresses challenges in face recognition and authentication, providing enhanced security, improved recognition accuracy, and efficient processing for facial recognition applications.

FIG. 1 illustrates a block diagram of general architecture of a face identification system (hereinafter interchangeably referred to as "system", and as represented by reference numeral 100). The system 100 provides a solution for secure and accurate facial recognition. The system 100 integrates multiple components to capture, encrypt, analyze, and identify facial images while maintaining high levels of data security and recognition accuracy. The system 100 is capable of processing facial images in real-time, making it suitable for applications such as access control, security surveillance, and identity verification. The modular architecture of the system 100 allows for flexibility and potential customization to meet specific deployment requirements.

As illustrated in FIG. 1, the system 100 includes a camera 102 for capturing facial images, encryption circuitry 104 for securing the captured images, feature extraction circuitry 106 for processing encrypted images, a face recognition system 108 for identifying faces, and an identification notifying system 110 for transmitting recognition results. These components work together in a sequential and integrated manner to form a complete face identification pipeline. The system 100 processes facial data from initial capture through final identification and notification, maintaining data security throughout each stage. Each component of the system 100 is designed to interface with the others, ensuring efficient data flow and processing. The modular nature of the system 100 allows for potential upgrades or modifications to individual components without necessitating a complete system overhaul. This architecture enables the system 100 to adapt to evolving security requirements and technological advancements in facial recognition technology.

In an embodiment, an encryption component may be implemented in a device that is separate from face recognition component. The device implementing the encryption component is then connected to a device implementing the face recognition component by a wired or wireless communication connection, for example a communication/data link between encryption circuitry 104 and feature extraction circuitry 106. Subsequently, the encrypted face image cannot be identified by a third party that maliciously intercepts the face image as it is transmitted over the communication/data link. In an embodiment, the communication link can be one or more of WiFi, Bluetooth, Ethernet, or USB.

In the system 100, the camera 102 is implemented for capturing an image of a person's face. The camera 102 is configured to acquire digital images of facial features under various environmental conditions. The camera 102 may be a standard digital camera or a specialized imaging device optimized for facial recognition applications. The camera 102 is adapted to have sufficient resolution to capture detailed facial characteristics, for accurate identification.

The camera 102 may also incorporate low-light performance capabilities to ensure clear image capture in suboptimal lighting conditions. The camera 102 may further be equipped with auto-focus and auto-exposure features to adapt to different subjects and lighting scenarios. In the present configuration, the camera 102 interfaces directly with the encryption circuitry 104, ensuring that the captured facial images are secured upon acquisition.

In some embodiments, the system 100 includes preprocessing circuitry 112 receiving facial image from the camera 102, and pre-processing the facial image before encryption. The preprocessing circuitry 112 performs two main functions: face detection and face alignment. In the face detection stage, the preprocessing circuitry 112 analyzes the input image to locate and isolate the facial region within the overall image. This step is ensures that subsequent processing focuses solely on relevant facial features. Following face detection, the preprocessing circuitry 112 proceeds to face alignment. During this stage, the detected face is adjusted to a standardized position and orientation. Face alignment typically involves identifying key facial landmarks such as eyes, nose, and mouth, and using these reference points to normalize the face image. This normalization process may include rotating, scaling, or cropping the image to ensure consistent input for the encryption and recognition stages. The preprocessing circuitry 112 helps to improve the overall accuracy and efficiency of the system 100 by providing standardized and optimized facial images for further processing. In the system 100, the output of the preprocessing circuitry 112 is a preprocessed facial image that is then passed to the encryption circuitry 104 for secure encoding.

The encryption circuitry 104 is configured to encrypt the captured facial image to obtain an encrypted facial image. The encryption circuitry 104 receives the raw (from the camera 102) or the pre-processed (from the preprocessing circuitry 112) facial image data and applies a multi-stage encryption process to secure the image. This encryption process is designed to transform the original facial image into a format that is resistant to unauthorized decryption or manipulation. The encryption circuitry 104 operates on each pixel of the original facial image, applying complex mathematical transformations to obscure the original facial features while preserving the data structure required for subsequent analysis. The output of the encryption circuitry 104 is the encrypted facial image that retains the essential characteristics of the original image but in a secure, encoded format that can be safely stored, transmitted, or further processed by subsequent components of the system 100. It may be understood that the encryption process implemented by the encryption circuitry 104 is reversible, allowing for decryption when necessary, but only with the appropriate keys and algorithms.

In the present embodiments, the encryption circuitry 104 includes a pixel-bit converter 114 configured to transform each pixel intensity into binary digits to obtain a binary format of the facial image. The pixel-bit converter 114 operates on the preprocessed facial image received from the preprocessing circuitry. The process of converting pixels to bits involves translating brightness values of each pixel in original grayscale image into binary representations. Each pixel's intensity, ranging from 0 (representing black) to 255 (representing white), is transformed into binary digits, typically denoted as 1 for white and 0 for black. For example, in an 8-bit grayscale image, each pixel value ranging from 0 to 255 is converted into its 8-bit binary representation. The pixel-bit converter 114 transforms pixel values into binary (0 or 1) based on a threshold; pixels above the threshold are assigned a 1, and those below are assigned a 0. The threshold can be fixed or adaptive, adjusting based on local pixel neighborhoods. This conversion creates a binary matrix representation of the entire facial image, which facilitates subsequent computational operations by representing image data in a binary format. The process performed by the pixel-bit converter 114 helps in the encryption process, as it transforms the continuous-tone image into a discrete binary format that is more flexible to subsequent encryption operations. The binary format produced by the pixel-bit converter 114 preserves all the information from the original image while representing it in a form that can be efficiently manipulated by the following stages of the encryption circuitry 104. The output of the pixel-bit converter 114 is a complete binary representation of the facial image, which is then passed to the next component of the encryption circuitry 104 for further processing.

The encryption circuitry 104 also includes a two-dimensional (2D) cellular automata function 116 configured to apply specific transition rules to the binary format of the facial image to obtain a transformed image. The 2D cellular automata function 116 of the system 100 employs principles commonly used in various digital applications. The 2D cellular automata function 116 operates on a matrix of cells, where each cell represents a binary state. The function of the 2D cellular automata function 116 in image processing can include example tasks such as image enhancement, compression, encryption, and watermarking. The 2D cellular automata function 116 generates complex patterns using simple rules, making the function suitable for encryption purposes in the system 100. The 2D cellular automata function 116 defines cell interactions through neighborhoods. In the system 100, the 2D cellular automata function 116 utilizes a two-dimensional configuration. Transitioning to 2D cellular automata, two common neighborhood methods are employed: Von Neumann and Moore neighborhoods The Von Neumann neighborhood, defined as $$NH(x_0, y_0, r) = [(x, y): |x - x_0| + |y - y_0| \leq r],$$

containing $2r(r_1)+1$ cells in each neighborhood, is one possible configuration for the 2D cellular automata function 116. Atypical implementation uses a range of one, resulting in a five-cell neighborhood including the central cell and its adjacent neighbors to the north, south, east, and west.

Specifically, in the system 100, the 2D cellular automata function 116 receives the binary format of the facial image produced by the pixel-bit converter 114. The 2D cellular automata function 116 operates on a 3×3 matrix of cells containing binary numbers, where each binary number is one of two states. Herein, the binary numbers are transitioned to next states by update rules. In particular, the 2D cellular automata function 116 applies a set of predefined rules to determine the next state of each cell based on the current states of its neighboring cells. These rules govern how the binary numbers are transitioned to their next states. The 2D cellular automata function 116 processes the entire binary image iteratively, with each iteration potentially changing the state of multiple cells. This iterative process introduces complex, chaotic behavior into the image data, effectively scrambling the original facial features. The number of iterations performed by the 2D cellular automata function 116 can be adjusted to balance security requirements with computational efficiency. The transformed image produced by the 2D cellular automata function 116 has little resemblance to the original binary format, yet retains all the information in an encrypted form. The output of the 2D cellular automata function 116 is then passed to the next stage of the encryption process within the encryption circuitry 104.

In an embodiment, the 2D cellular automata function 116 uses game of life update rules to transition to next states. That is, the 2D cellular automata function 116 in the system 100 may implement rules similar to those used in the Game of Life (GOL) principles to transition cell states. These rules govern how the binary values in the 3×3 matrix of cells change over time, creating complex patterns that contribute to the encryption process. The 2D cellular automata function 116 applies these rules iteratively to each cell in the binary format of the facial image. In this configuration, the 2D cellular automata function 116 operates on an M×N matrix of cells, each in one of two states. The 2D cellular automata function 116 updates the state of each cell based on the states of neighboring cells according to specific transition rules. These rules, as implemented in the 2D cellular automata function 116, includes:

1. If a cell has a value of 0 at time t, the cell becomes 1 at time t+1 if exactly three neighbor cells are 1 at time t. This rule simulates the "birth" of a new active cell.
2. If a cell is 1 at time t, the cell becomes 0 at time t+1 if four or more of the neighbor cells are 1 at time t. This rule represents "death" due to overcrowding.
3. If a cell is 1 at time t, the cell becomes 0 at time t+1 if one or none of the neighbor cells are 1 at time t. This rule simulates "death" due to isolation or exposure.
4. If a cell is 1 at time t, the cell will remain 1 at time t+1 if two or three of the neighbor cells are 1 at time t. This rule simulates the survival of an active cell under balanced conditions.

The 2D cellular automata function 116 applies these rules simultaneously to all cells in the matrix during each generation (or time step), resulting in a transformed image that forms the basis for the encrypted facial image in the system 100. The 2D cellular automata function may apply the function over several generations (time steps).

The encryption circuitry 104 further includes a gray code generator 118 to map the binary numbers to unique gray-scale values within a specific range to generate a gray code image. The gray code generator 118 converts the binary numbers into gray code, where each value is generated by XORing adjacent binary bits, ensuring that only one bit changes between successive values. The resulting gray code values are used in the image encryption process to enhance security by reducing the likelihood of errors and making the encryption process more resistant to attacks. In particular, the gray code generator 118 utilizes gray code technique for the encryption of facial images to reduce the number of gray-scale values, thereby compressing the image data. The compression achieved by the gray code generator 118 reduces the amount of data required for storing or communicating the facial image, enhancing both security and efficiency of the system 100. The gray code generator 118 implements a binary numeral system where two successive values differ in only one bit, a property that contributes to the security of the encrypted facial image.

The gray code generator 118 applies the gray code technique to the facial image encryption process in several steps. First, the gray code generator 118 performs pixel value transformation, converting each pixel value in the facial image to a corresponding Gray code representation. This transformation ensures that adjacent pixel values are represented by codes that differ by only one bit, which can help in reducing the visual impact of small changes in the encrypted image.

Next, in an embodiment, the gray code generator 118 may utilize a secure encryption key to further process the Gray code representation of the facial image. This key can be used by the gray code generator 118 to perform various cryptographic operations such as XORing, substitution, permutation, or other mathematical transformations on the gray code values. The gray code generator 118 then applies an encryption algorithm to the gray code representation of the facial image using the encryption key. This algorithm implemented by the gray code generator 118 may involve bitwise operations, chaotic maps, or other mathematical functions to scramble the gray code values based on the encryption key. The encryption process performed by the gray code generator 118 can be further enhanced with additional encryption algorithms such as Advanced Encryption Standard (AES) or Rivest-Shamir-Adleman (RSA) to provide strong protection for the facial image data. For decryption purposes, the system 100 can perform inverse operations using the same encryption key to restore the original gray code values, which are then transformed back to the original pixel values of the facial image. This decryption process ensures that the encrypted facial image can be accurately reconstructed when needed for face recognition tasks within the system 100.

In particular, in the system 100, the gray code generator 118 receives the transformed binary image output from the 2D cellular automata function 116. The gray code generator 118 processes this binary data by mapping each binary number to a corresponding unique gray-scale value. The gray-scale values are selected from a predefined range, which may be determined based on the desired bit depth of the output image. The mapping process performed by the gray code generator 118 ensures that adjacent gray-scale values differ by only one bit, which is a key characteristic of gray code technique. This property helps in reducing the visual impact of changes in the encrypted image and provides an additional layer of security. The gray code generator 118 applies this mapping systematically to all binary numbers in the transformed image, converting the binary representation into a gray-scale image. The resulting gray code image retains the complex patterns introduced by the 2D cellular automata function 116 but represents them in a format that is more suitable for further processing or storage. The output of the gray code generator 118 is an encrypted facial image in gray-scale format, which forms the final product of the encryption circuitry 104 in the system 100.

To further enhance the security of the encryption process, the system 100 may further include key generation circuitry 120 configured to generate an encryption key as a chaotic sequence. The key generation circuitry 120 is designed to produce complex, unpredictable sequences that serve as encryption keys for enhancing the security of the facial image encryption process. The key generation circuitry 120 uses chaotic sequences to generate the encryption key. A chaotic sequence key generator is a type of algorithm designed to generate unique and seemingly unpredictable strings of characters. These sequences are often used in cryptography and encryption to secure sensitive information and protect against unauthorized access. A main advantage of the chaotic sequence key generators is their ability to generate random strings of characters without relying on any deterministic or predictable input. Additionally, the chaotic sequence key generators are designed to be resistant to statistical analysis, which makes it difficult for attackers to use legal methods to guess or decrypt the generated key.

In an embodiment, the key generation circuitry 120 is configured to generate the chaotic sequence using a logistic map. The logistic map is a simple non-linear equation that exhibits complex and unpredictable behavior despite its deterministic nature. The logistic map applications can be found in various fields, such as population modeling, where it can model population growth considering limited resources, where growth depends on the current population; cryptography, where its chaotic nature can generate pseudo-random numbers for encryption purposes; and chaos theory, which is a classic example for studying chaotic systems and their properties. In an example embodiment, the logistic map implemented by the key generation circuitry 120 is defined by the equation:

$$x = r*x*(1-x),$$

where x represents a value of the sequence at an iteration n, and r is a parameter between 0 and 4. In one configuration of the present system 100, the key generation circuitry 120 utilizes specific initial values for this logistic map. Herein, an initial value of x is 0.5 and the parameter r is 3.9. These values are chosen to ensure the chaotic behavior of the generated sequence, maximizing the randomness and security of the encryption key.

In addition, or alternative, to the logistic map technique, the key generation circuitry 120 is further configured to generate random strings of characters as the encryption key. This alternative approach provides another option for creating strong, unpredictable encryption keys within the system 100. The ability to generate encryption keys through multiple methods enhances the flexibility and security of the system 100.

In the system 100, the encryption circuitry 104 is configured to apply an encryption algorithm to the gray code image using the encryption key generated by the key generation circuitry 120. This step in the encryption process further secures the facial image data by combining the gray code representation with the chaotic or randomly generated encryption key. The encryption algorithm applied by the encryption circuitry 104 may involve various cryptographic operations such as substitution, permutation, or other mathematical transformations, based on the encryption key. This additional layer of encryption enhances the overall security of the facial image data within the system 100.

The system 100 further includes feature extraction circuitry 106 configured to extract features of the encrypted facial image. The feature extraction circuitry 106 operates on the encrypted facial image produced by the encryption circuitry 104. The feature extraction circuitry 106 works directly on the encrypted data to maintain security throughout the feature extraction process. In general, the feature extraction process involves transforming the raw encrypted data into a format more suitable for analysis and further processing within the system 100. The feature extraction circuitry 106 operates on the initial data collected from the encryption circuitry 104, which in this context is the encrypted facial image represented as pixel values. The feature extraction circuitry 106 selects or transforms the encrypted raw data into a set of features that best represent the underlying patterns or characteristics of the facial image. These features are designed to capture the most relevant information while discarding irrelevant or redundant data.

The specific feature extraction methods employed by the feature extraction circuitry 106 are tailored to the encrypted image data and the requirements of the system 100. In the context of encrypted image processing, the features extracted by the feature extraction circuitry 106 may include edges, textures, or other patterns that persist in the encrypted domain. Once the features are extracted, the feature extraction circuitry 106 represents them in a suitable format for analysis. This representation may involve organizing the features into vectors, matrices, or other data structures that are compatible with the algorithms used in the subsequent stages of the system 100. The feature extraction circuitry 106 may also perform dimensionality reduction to address potential computational challenges and overfitting issues associated with high-dimensional feature sets, where the high-dimensional data of the encrypted image is transformed into a lower-dimensional feature space. This reduction in dimensionality helps to improve the efficiency of subsequent face recognition processes. The output of the feature extraction circuitry 106 is a set of encrypted features that represent the essential characteristics of the facial image. In some cases, before the extracted features are passed further in the system 100, the feature extraction circuitry 106 may perform normalization or scaling. This step ensures that each extracted feature contributes equally to the analysis in the subsequent stages of the face identification process.

In an embodiment, the feature extraction circuitry 106 is further configured to extract the features using principal component analysis (PCA). PCA is a dimensionality reduction technique that is used to extract the most important features from high-dimensional data. In the context of face recognition, PCA is employed to reduce the dimensionality of face images while retaining the essential information necessary for accurate recognition. The PCA process performed by the feature extraction circuitry 106 begins with the computation of the mean face from the dataset of encrypted facial images. The feature extraction circuitry 106 then subtracts this mean face from each encrypted image to center the data. Following this, the feature extraction circuitry 106 constructs a covariance matrix from the centered face images, which captures the relationships between different pixels or features of the face images. PCA is then applied to this covariance matrix to derive eigenfaces, which are the eigenvectors corresponding to largest eigenvalues. These eigenfaces represent the principal components of variation in the encrypted facial images. By using PCA, the feature extraction circuitry 106 effectively reduces the dimensionality of the encrypted facial data while retaining the most significant features for face recognition. This approach enhances both the efficiency and accuracy of the subsequent face recognition process.

Furthermore, the system 100 includes a face recognition system 108 configured to identify the face in the facial image using the extracted encrypted features. The face recognition system 108 receives the encrypted features produced by the feature extraction circuitry 106. The face recognition system 108 is configured to compare these extracted encrypted features against a database of known facial features to determine the identity of the individual in the original facial image. The face recognition system 108 may use various similarity measures to quantify the resemblance between input features and stored features. The specific similarity measure and classification method used by the face recognition system 108 are optimized for performance with encrypted data. The face recognition system 108 processes the comparison results to determine the closest match or matches from the database. The face recognition system 108 is designed to handle variations in the encrypted features that may arise from differences in facial expressions, lighting conditions, or other factors, ensuring robust performance across various input conditions. The output of the face recognition system 108 is an identification result, which may include the identity of the recognized individual's face, a confidence score indicating the reliability of the match, or a list of potential matches ranked by similarity.

Herein, the face recognition system 108 is configured to classify the extracted encrypted image using Euclidean distance as a similarity measure with a database of known facial features associated with specific individuals. This classification process involves comparing the extracted encrypted features of the input facial image with a database of known facial features associated with specific individuals. The database maintained by the face recognition system 108 contains encrypted feature vectors representing the facial characteristics of known individuals, each associated with a unique identifier or identity information. The face recognition system 108 calculates the Euclidean distance between the input feature vector and each feature vector in the database. The Euclidean distance is computed as the square root of the sum of the squared differences between corresponding elements of the two feature vectors. The face recognition system 108 performs this distance calculation for all entries in the database, resulting in a set of distance values. The smallest distance value indicates the closest match between the input image and a known individual in the database. The face recognition system 108 may use a threshold value to determine if the closest match is sufficiently similar to be considered a positive identification. If the smallest distance is below this threshold, the face recognition system 108 classifies the input image as belonging to the individual associated with that entry in the database.

In particular, the face recognition system 108 includes an encrypted feature database 122 that stores known facial features associated with specific individuals. The encrypted feature database 122 is populated with features extracted from a dataset of encrypted face images using the same encryption and feature extraction processes applied to new input images. Specifically, to prepare the encrypted feature database 122, the face recognition system 108 is configured to generate eigenfaces by applying PCA to the dataset of features for encrypted face images. These eigenfaces represent the principal components of variation in the encrypted facial features across the dataset. The eigenfaces form a basis for the feature space in which face recognition is performed. In cases where a new face image needs to be added to the encrypted feature database 122, the face recognition system 108 is configured to project the new image using PCA and store the resulting encrypted features in the encrypted feature database 122. This allows the face recognition system 108 to continuously update and expand its recognition capabilities as new individuals are added to the system 100.

The face recognition system 108 is further configured to identify a new face image that is projected using PCA. That is, when presented with a new face image for identification, the face recognition system 108 first projects the extracted encrypted features of the new image onto the eigenface space using PCA. This projection results in a set of coefficients that represent the new face image in the eigenface space. The face recognition system 108 then proceeds to classify the projected features of the new face image. The face recognition system 108 is designed to handle variations in the encrypted features that may arise from differences in facial expressions, lighting conditions, or other factors. The use of PCA and eigenfaces helps in capturing the most significant variations in facial features, for recognition across various input conditions. The output of the face recognition system 108 typically includes the identified individual's information, which is then used for further action or notification in the system 100.

Figure 2:
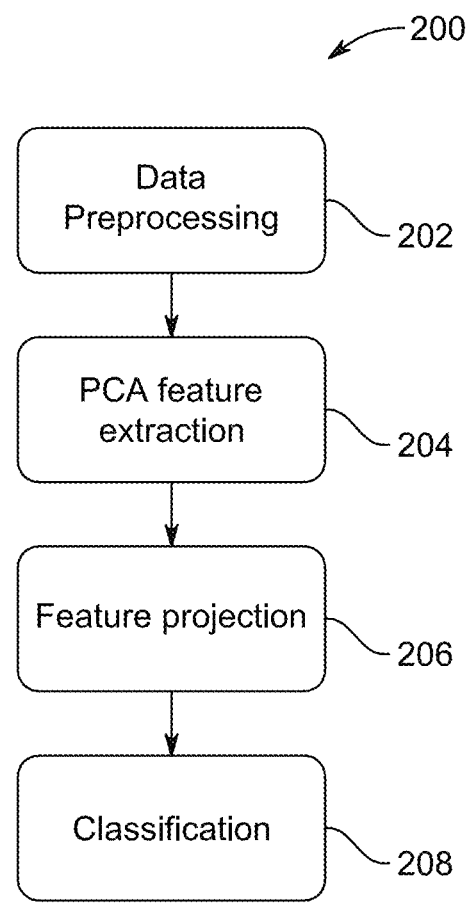
FIG. 2 is an exemplary flowchart of a process for feature extraction using principal component analysis (PCA) and subsequent classification with Euclidean distance implemented by the face identification system, according to certain embodiments.

FIG. 2 illustrates a flowchart of a process (as represented by reference numeral 200) listing steps involved in feature extraction using PCA and subsequent classification with Euclidean distance, as employed by the face identification system 100. The process 200 involves several stages, beginning with data preprocessing at step 202. Herein, the system 100 collects a dataset of face images, which may include variations in lighting conditions, facial expressions, poses, and the like. The system 100, then, preprocesses the collected data by standardizing the dimensions of the images and normalizing the pixel values to account for variations in illumination and contrast.

Following data preprocessing, at step 204, the system 100 performs PCA feature extraction. The system 100 computes the mean face from the dataset by averaging the pixel values of all face images, representing the "average" facial features. The system 100 then subtracts this mean face from each original face image to center the data around the origin, aiding in capturing data variances effectively. The system 100 constructs a covariance matrix from these centered face images, capturing relationships between different pixels or features. The system 100 subsequently performs eigenvalue decomposition on this covariance matrix to obtain eigenvectors (eigenfaces) and corresponding eigenvalues, representing the principal components of variation in the face images.

Further, at step 206, the system 100 performs feature projection, projecting each face image onto the PCA subspace covered by the eigenfaces. This projection results in a set of feature coefficients for each face image, representing the contributions of different eigenfaces to the original image. Finally, at step 208, the system 100 performs classification in which when a new face image requires recognition, the system 100 preprocesses it similarly to the training images, centering it and projecting it onto the PCA subspace. The system 100 calculates the Euclidean distance between the feature coefficients of the new face image and those of known individuals in the dataset. This Euclidean distance serves as a similarity measure between feature representations. The system 100 assigns the new face image to the class (individual) with the closest feature coefficients based on this Euclidean distance.

The process 200 involving PCA feature extraction and classification using Euclidean distance enables the face identification system 100 to effectively recognize faces in high-dimensional data by reducing dimensionality while preserving essential information for classification.

Referring back to FIG. 1, as illustrated, the system 100 further includes the identification notifying system 110 for transmitting a notification of the identified face. In the system 100, the identification notifying system 110 receives the results from the face recognition system 108 and communicates the outcome to external systems or personnel. In particular, the identification notifying system 110 is configured to process the identification results and generate appropriate notifications based on the outcome of the face recognition process. These notifications may take various forms depending on the specific application of the face identification system 100. The notifications generated by the identification notifying system 110 typically include information about the identified individual, such as a name, ID number, or other relevant identifiers.

In the present embodiments, the identification notifying system 110 is further configured to transmit a notification that grants or denies access based on the identified face. This functionality allows the face identification system 100 to be integrated into access control systems. When the face recognition system 108 positively identifies an individual and determines that the individual has the necessary permissions, the identification notifying system 110 generates and transmits a notification granting access. This notification may be sent to electronic door locks, security gates, or other access control mechanisms. Conversely, if the face recognition system 108 fails to identify the individual, identifies the individual as unauthorized, or if the confidence score of the identification falls below a predetermined threshold, the identification notifying system 110 generates and transmits a notification denying access. The identification notifying system 110 may also be configured to trigger additional security measures in cases of denied access, such as alerting security personnel or logging the attempted access for further review.

It may be appreciated that the notifications transmitted by the identification notifying system 110 can be customized based on the specific requirements of the application. These notifications may be sent through various channels, including but not limited to network messages, API calls to other systems, email alerts, or SMS messages. The identification notifying system 110 ensures that the appropriate parties or systems are informed of the face identification results, enabling timely responses to access requests or other identification-dependent actions.

Figure 3:
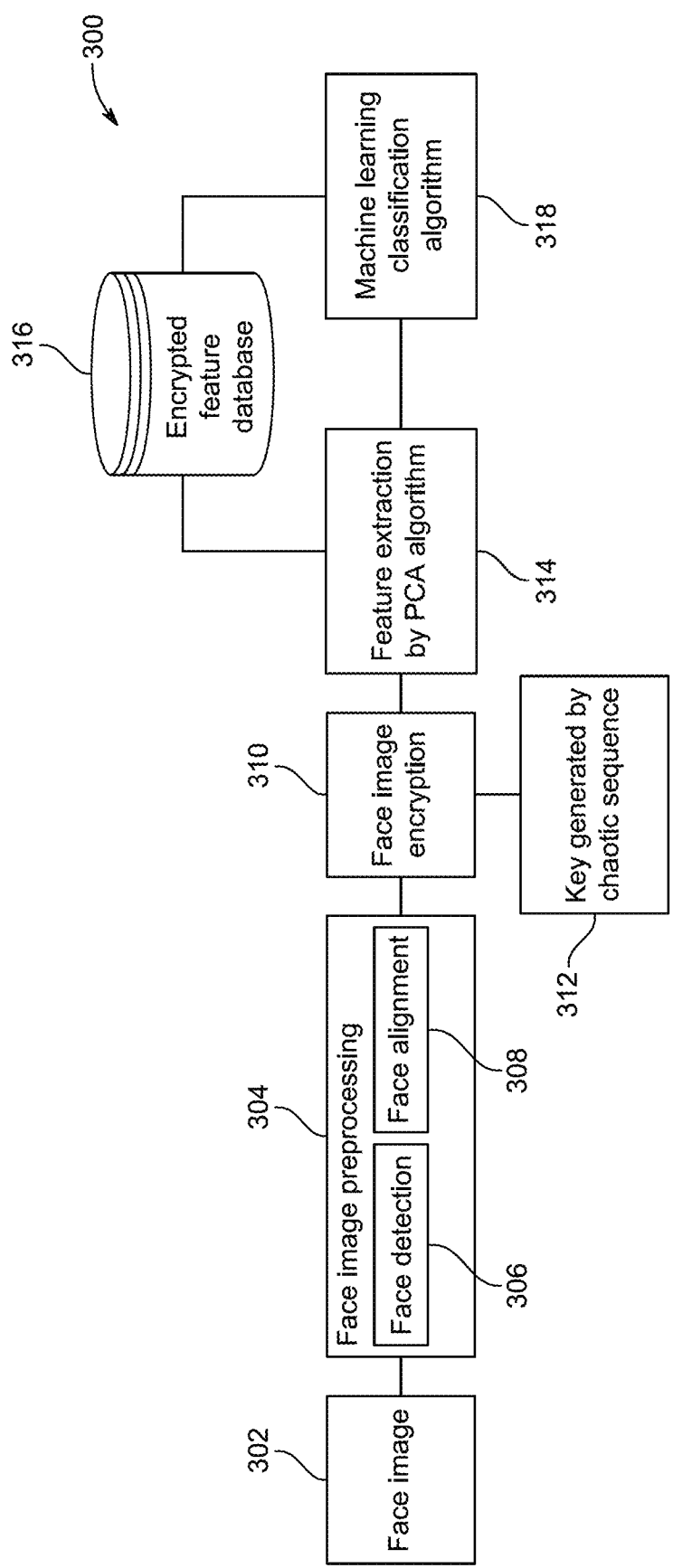
FIG. 3 is an exemplary flow diagram of a process for face image encryption and face image recognition in the face identification system, according to certain embodiments.

Referring to FIG. 3, illustrated is a flow diagram of a process 300 for face image encryption and face image recognition in the face identification system 100. The process 300 begins with a face image 302, which is the input to the system 100. The face image 302 first undergoes face image preprocessing 304. This face image preprocessing 304 includes two sub-steps: face detection 306 and face alignment 308. In the face detection 306, the system 100 locates and isolates the facial region within the input image. Following this, the face alignment 308 adjusts the detected face to a standardized position and orientation, typically by identifying key facial landmarks and using these to normalize the face image. After preprocessing, the face image undergoes face image encryption 310. This encryption process utilizes a key generated by chaotic sequence 312. The key generation circuitry 120 produces this chaotic sequence, which serves as the encryption key to secure the facial image data. The encrypted face image then proceeds to feature extraction by PCA algorithm 314. In this step, the feature extraction circuitry 106 applies Principal Component Analysis to the encrypted image data. This stage reduces the dimensionality of the data while preserving the most important features for facial recognition. The features are then stored in an encrypted feature database 316. The encrypted feature database 316 contains the feature sets for all known encrypted individuals in the system 100. The process 300 concludes with a machine learning classification algorithm 318. This step, performed by the face recognition system 108, compares the extracted features of the input image against the stored features in the encrypted feature database 316. The machine learning classification algorithm 318 determines the closest match and identifies the individual. Throughout the process 300, the face identification system 100 maintains the security of the facial data by operating in the encrypted domain, from the initial encryption step through feature extraction and classification. This approach ensures privacy and data protection while enabling accurate face recognition.

Figure 4:
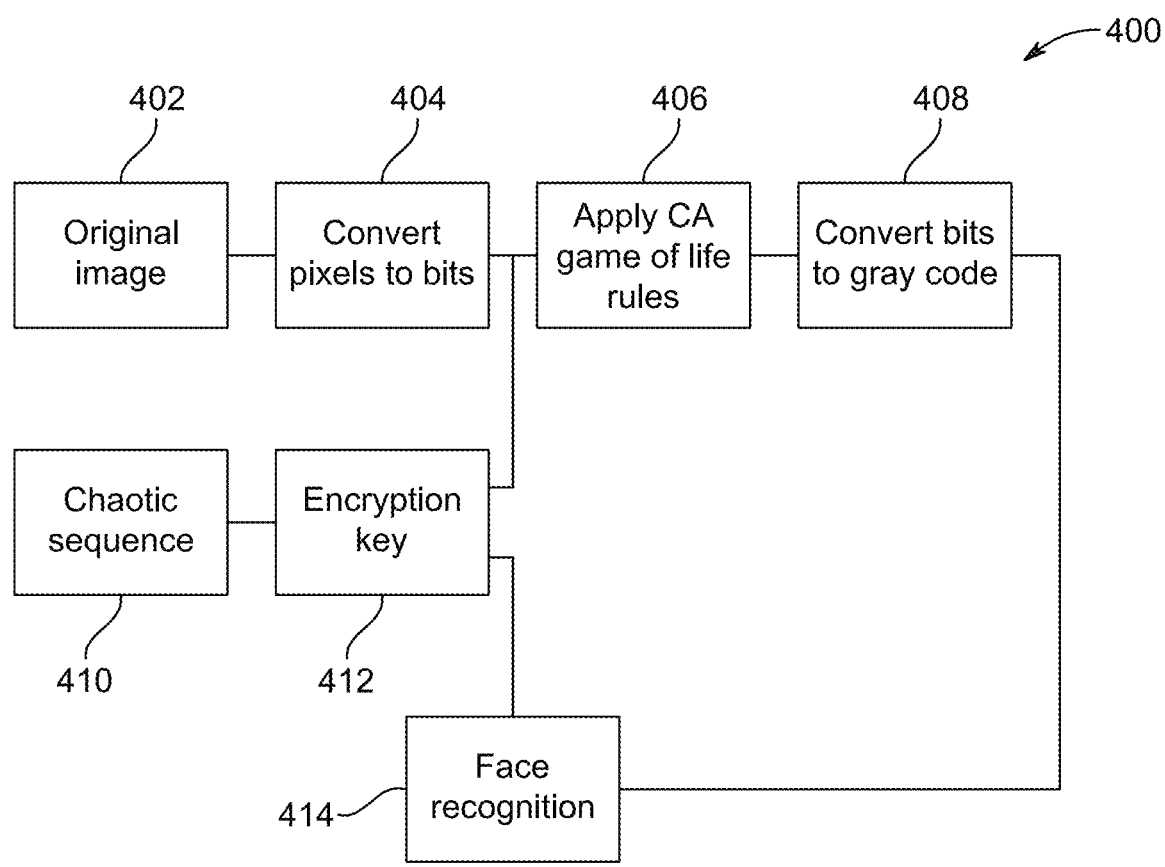
FIG. 4 is an exemplary flow diagram of a process for implementing image encryption based on a two-dimensional outer cellular mechanism and gray code in the face identification system, according to certain embodiments.

Referring to FIG. 4, illustrated is a flow diagram of a process 400 for implementing image encryption based on a two-dimensional outer cellular mechanism and gray code in the face identification system 100. The process 400 begins with an original image 402, which is the input facial image captured by the camera 102. In conversion process 404, pixels of original image 402 are converted to bits. This step is performed by the pixel-bit converter 114 of the encryption circuitry 104. The pixel-bit converter 114 transforms each pixel intensity value into binary digits, creating a binary format of the facial image. Following the pixel-to-bit conversion, in 406 the process 400 applies cellular automata (CA) game of life rules. This step is executed by the 2D cellular automata function 116 of the encryption circuitry 104, which applies the specified game of life rules to the binary format of the facial image, transforming it based on the states of neighboring cells. The next step 408 in the process 400 is to convert bits to gray code. This conversion is carried out by the gray code generator 118 of the encryption circuitry 104, which maps the binary numbers resulting from the cellular automata transformation to unique gray-scale values within a specific range, generating a gray code image. Concurrently, the process 400 involves generating a chaotic sequence 410, as performed by the key generation circuitry 120 of the system 100. The chaotic sequence serves as the basis for generating an encryption key 412. The encryption key 412 is used in conjunction with the other steps of the encryption process to enhance security. The face recognition 414 stage involves receiving inputs from multiple stages of the process. This involves taking input from the application of CA game of life rules 406, the encryption key 412, and the conversion of bits to gray code 408. The face recognition 414 uses these inputs to perform the identification process on the encrypted facial image. This process 400 ensures that the facial image is thoroughly encrypted through multiple transformations before being used for face recognition, maintaining data security throughout the identification process in the face identification system 100.

Figure 5:
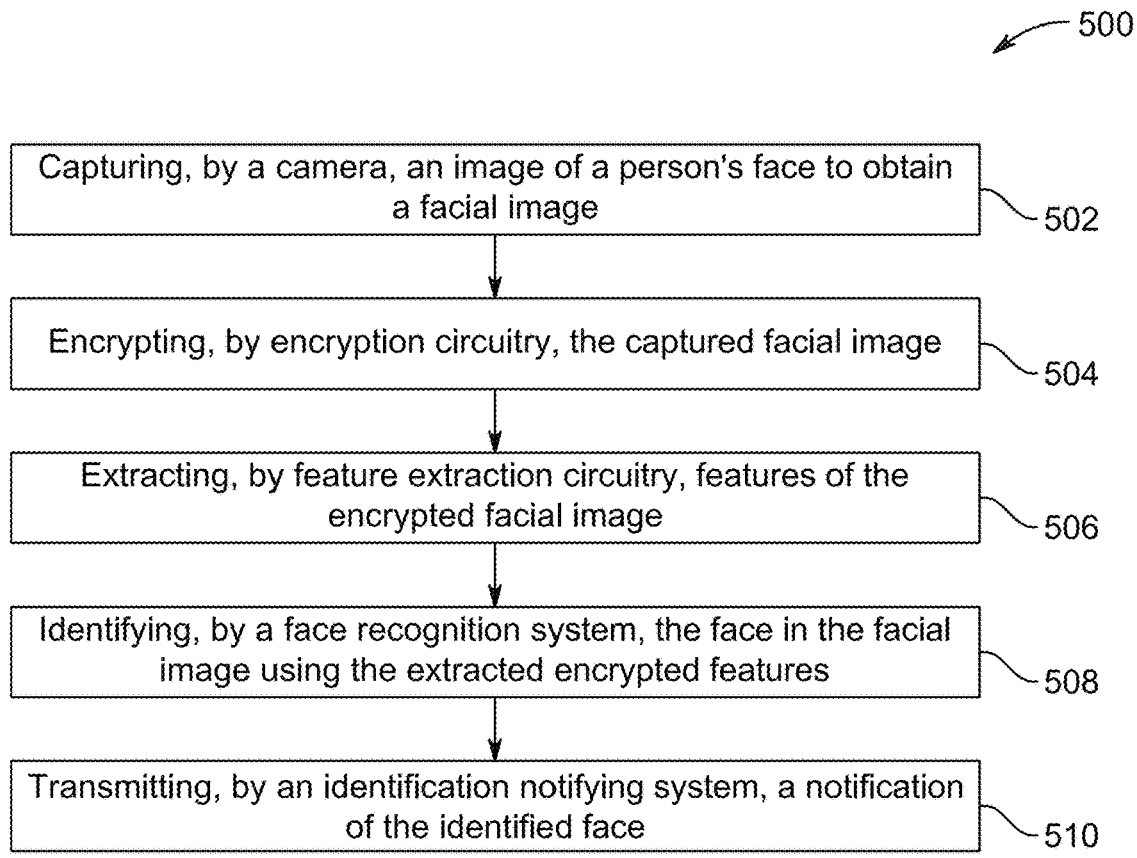
FIG. 5 is an exemplary flowchart of a method for identifying a face image, according to certain embodiments.

In an aspect, the present disclosure implements a non-transitory computer-readable storage medium containing computer executable instructions for execution of the face identification process. When executed by a computer, these instructions cause the computer to perform a method for identifying a face image. FIG. 5 is an exemplary flowchart of a method for identifying a face image. The method 500 comprises several steps that correspond to the operations of the various components of the face identification system 100. These steps are only illustrative, and other alternatives may be considered where one or more steps are added, one or more steps are removed, or one or more steps are provided in a different sequence without departing from the scope of the present disclosure. Various variants disclosed above, with respect to the system 100 apply with the necessary changes to the present method 500.

At step 502, the method 500 includes capturing an image of a person's face to obtain a facial image. This step is performed by a camera, which may be the camera 102 of the face identification system 100. The camera captures a high-quality digital image of the subject's face, ensuring that sufficient detail is present for subsequent processing and analysis.

At step 504, the method 500 includes encrypting the captured facial image. This encryption step is carried out by encryption circuitry, which may correspond to the encryption circuitry 104 of the face identification system 100. The encryption process is designed to secure the facial image data, protecting it from unauthorized access or tampering.

Herein, the encryption process performed by the encryption circuitry involves several sub-steps. First, the encrypting by the encryption circuitry includes transforming each pixel intensity into binary digits to obtain a binary format of the facial image. That is, the encryption circuitry transforms each pixel intensity of the facial image into binary digits. This transformation results in a binary format of the facial image, where each pixel is represented by a 1 and 0 rather than its original intensity value.

Further, the encrypting by the encryption circuitry includes transforming, by 2D cellular automata, the binary format of the facial image to obtain a transformed image. That is, the encryption circuitry applies a transformation using 2D cellular automata to the binary format of the facial image. This transformation produces a new, transformed image. The 2D cellular automata operates on a 3×3 matrix of cells. Herein, each binary number is one of two states. In other words, each cell contains a binary number representing one of two possible states. The binary numbers are transitioned to next states by update rules. That is, the binary numbers in these cells are transitioned to new states according to predefined update rules, which govern how the state of each cell changes based on the states of its neighboring cells.

Further, the encrypting by the encryption circuitry includes mapping the binary numbers to unique gray-scale values within a specific range to generate a gray code image. That is, the final sub-step of the encryption process involves mapping the binary numbers resulting from the cellular automata transformation to unique gray-scale values within a specific range. This mapping generates a gray code image, which represents the encrypted form of the original facial image. The use of gray code ensures that adjacent gray-scale values differ by only one bit, providing an additional layer of security and efficiency in the encryption process.

At step 506, the method 500 includes extracting features of the encrypted facial image. This feature extraction is performed by feature extraction circuitry, which may correspond to the feature extraction circuitry 106 of the face identification system 100. The feature extraction process is designed to identify and isolate key characteristics of the face from the encrypted image data. These features serve as the basis for subsequent face recognition tasks.

At step 508, the method 500 identifying the face in the facial image using the extracted encrypted features. In this step, a face recognition system, which may correspond to the face recognition system 108 of the face identification system 100, identifies the face in the facial image using the extracted encrypted features. The face recognition system compares the extracted features against a database of known facial features to determine the identity of the individual in the image.

At step 510, the method 500 includes transmitting a notification of the identified face. This step is carried out by an identification notifying system, which may correspond to the identification notifying system 110 of the face identification system 100. The notification may include the identity of the recognized individual, a confidence score indicating the reliability of the match, or other relevant information depending on the specific application of the face identification system.

The method 500, as implemented through these computer executable instructions, performs secure and efficient face recognition tasks while maintaining a high level of data protection throughout the entire process. Throughout this process, the method 500 maintains the security of the facial image data by operating primarily in the encrypted domain. From the initial encryption step through feature extraction and recognition, the facial data remains in a secure, encrypted form. This approach ensures that even if the data were to be intercepted at any point in the process, it would be extremely difficult for an unauthorized party to extract meaningful information or reconstruct the original facial image.

In present embodiments, the method 500 further includes generating an encryption key as a chaotic sequence. This involves the creation of a complex, random sequence of values that serves as the encryption key. The chaotic nature of this sequence ensures that the encryption key is highly unpredictable and difficult to replicate without knowledge of the exact parameters used in its generation.

In one implementation, the method 500 includes generating the chaotic sequence using a logistic map. The logistic map is defined by the equation $$x = r * x * (1-x),$$

where x represents a value of the sequence at an iteration n, and r is a parameter between 0 and 4. In this specific implementation, an initial value of x is set to 0.5, and the parameter r is set to 3.9. These values are chosen to ensure that the resulting sequence exhibits chaotic behavior, providing a high degree of randomness in the encryption key.

Alternatively, or additionally, the method 500 includes generating random strings of characters as the encryption key. This approach provides another means of creating a unique and unpredictable key for each encryption process.

The method 500 further includes applying an encryption algorithm to the gray code image using the encryption key. This step adds an additional layer of security to the already transformed image, making it even more resistant to unauthorized decryption or analysis.

The method 500 further includes extracting the features using principal component analysis. That is, in the feature extraction phase, the method 500 employs PCA to extract relevant features from the encrypted facial image. PCA is a statistical procedure that uses an orthogonal transformation to convert a set of observations of possibly correlated variables into a set of values of linearly uncorrelated variables called principal components.

The face identification system 100 of the present disclosure was tested using ORL (Olivetti Research Laboratory) dataset. This dataset was selected due to its characteristics, containing a diverse set of 400 images of 40 distinct subjects, with variations in facial expressions. The manageable size of the dataset, with each image measuring 92×112 pixels, made it suitable for initial experimentation and for studying the effectiveness of the proposed approach. The public availability of the dataset further facilitated its use in this research. Table 1 below lists properties of ORL database.

| Property | Description |
| --- | --- |
| No. od subject | 40 |
| No. of image | 400 |
| Purpose | This database primary used for face recognition |
| Static/Video | Static |
| Format | .pgm |
| Resolution | 92 × 112 |
| Background | Dark homogenous |
| Accessories | Glasses |

Table 1: Properties of ORL Database

The ORL database, containing 400 images of 40 individuals, was used to test the present disclosed method. Pre-processing techniques were applied to the database to enhance the recognition rate. The properties of the ORL database included 40 subjects, 400 images, a primary purpose for face recognition, static images in .pgm format, a resolution of 92×112 pixels, a dark homogenous background, and the presence of accessories such as glasses in some images.

The integration of the image encryption model into the face identification system 100 presented an opportunity to enhance security measures during the training and testing phases using the ORL database. By leveraging encrypted images, the face identification system 100 ensured that only correctly encoded images were authenticated, effectively reducing the potential for false positives.

In the classifier training phase, once the discriminative features were extracted from the encrypted images, they were passed to a classifier component within the face recognition system 108. The role of the classifier was to learn and understand the patterns and associations present in the extracted features. This learning process occurred through training on a labeled dataset of facial features. The dataset contained examples of extracted features along with their corresponding identities or labels. During training, the classifier adjusted its internal parameters and algorithms to recognize these patterns and make accurate predictions about the identities associated with the features. The training phase was iterative and aimed to optimize the performance of the classifier in accurately identifying individuals based on their facial features.

During the recognition and authentication processes within the integrated face identification system 100, encrypted images or live camera feeds containing facial data were fed into the trained system. This phase initiated with the feature extraction circuitry 106, which deciphered salient facial attributes from the encrypted images or live video frames. These attributes included facial landmarks, texture patterns, color gradients, and other distinguishing features unique to each individual.

Once the feature extraction was completed, the extracted features were compared against stored templates or identities within the encrypted feature database of the face recognition system 108. This comparison involved sophisticated algorithms that measured the similarity between the extracted features and the features stored in the database. The database contained a collection of known facial features associated with specific identities or individuals.

During the matching process, the face recognition system 108 calculated a similarity score or a distance metric between the extracted features and each entry in the database. This score indicated how closely the extracted features aligned with the stored templates. If the similarity score surpassed a predefined threshold or met certain criteria, the face recognition system 108 recognized the individual as a known identity or authenticated their identity, depending on the specific application context.

In the case of authentication, the face identification system 100 confirmed the identity of the individual based on a successful match with the stored template or identity in the database. This authentication process granted access or permitted specific actions based on the recognized identity. Conversely, during recognition tasks, the face recognition system 108 identified the individual by associating the extracted features with a known identity from the database, providing relevant information or tailored services based on the recognized identity.

The recognition and authentication processes were iterative and continuous, allowing the face identification system 100 to perform real-time identity verification from encrypted images or live video streams. This integration of face recognition technology added a robust layer of security and convenience to various applications, ranging from access control systems and surveillance to personalized services and secure transactions.

Further, to evaluate the proposed approach in the face identification system 100, several metrics were applied. One such metric was the Number of Pixels Change Rate (NPCR) analysis. The NPCR is commonly used in image processing and encryption to assess the level of alteration or change introduced by an encryption algorithm. The purpose of NPCR analysis in the face identification system 100 was to quantify the degree of change in pixel values between an original facial image and its encrypted counterpart. This evaluation aimed to determine how effectively the encryption process modified the image, with a high degree of change indicating that the encryption was effective in significantly altering the image's appearance.

The NPCR was calculated by comparing corresponding pixels in the original and encrypted facial images and determining the percentage of pixels that had changed. The calculation was performed using the following formula:

$$NPCR(I,E) = ^{i=0,j=0} \text{if } I(i,j) = E(i,j) \rightarrow x(i,j) = 0 \text{ if } I(i,j) \neq E(i,j) \rightarrow x(i,j) = 1$$

In interpreting the NPCR results, a high NPCR percentage indicated that a significant portion of pixels in the facial image had been altered during the encryption process. This high degree of change was desirable in the face identification system 100 because it made the encrypted facial image appear drastically different from the original, rendering it difficult for unauthorized parties to decipher the content or extract meaningful information.

From a security standpoint, a high NPCR was advantageous for the face identification system 100 as it enhanced the confidentiality and integrity of the encrypted facial data. It ensured that even if an encrypted facial image was intercepted or accessed by unauthorized individuals, the encrypted content remained highly obscured and challenging to interpret without the decryption key.

The NPCR analysis was employed during the evaluation of the encryption algorithms in the face identification system 100 to assess their effectiveness in altering facial image content while maintaining data integrity and security. A successful encryption algorithm in the system achieved a high NPCR while also preserving essential features necessary for accurate decryption and recognition.

To demonstrate the effectiveness of the encryption in the face identification system 100, NPCR values were calculated for several image pairs. The results are presented in Table 2 below, for an original image with 10,000 total pixels.

TABLE 2

NPCR evaluation metric

| Image Pair | Total Pixels | Changed Pixels | NPCR (%) |
|---|---|---|---|
| Original Image | 10000 | — | — |
| Encrypted Image pair 1 | 10000 | 7850 | 78.50 |
| Encrypted Image Pair 2 | 10000 | 7100 | 71.00 |
| Encrypted Image Pair 3 | 10000 | 9200 | 92.00 |

Analysis of these results showed that Image Pair 1, with an NPCR value of 78.50%, suggested a high degree of alteration, which was favorable for encryption as it made the content highly obscure. Image Pair 2, with an NPCR value of 71.00%, also demonstrated a significant level of change after encryption, indicating effective alteration of the image's appearance. Image Pair 3, with an NPCR value of 92.00%, indicated a very high degree of change, signifying robust encryption that altered the image substantially. This level of alteration was advantageous for maintaining data confidentiality and integrity in the face identification system 100.

Further, the face identification system 100 of the present disclosure was evaluated using several metrics to assess its performance and security. These metrics included the Gray Difference Degree (GDD), entropy analysis, and visual comparisons of histograms and encrypted images.

The GDD was used to measure the difference in pixel intensity changes between the original and encrypted facial images. It provides insights into the level of alteration or transformation applied to an image. GDD is often used alongside other metrics, such as NPCR (Number of Pixels Change Rate) and UACI (Unified Average Changing Intensity), to comprehensively evaluate the effectiveness and impact of image processing or encryption techniques. Generally, GDD provides valuable information about the level of alteration or transformation applied to an image. It helps in assessing the sensitivity of the transformation process to changes in the input image and provides a quantitative measure of the transformation's impact on image characteristics.

GDD is computed by comparing the pixel intensity changes in corresponding positions between the original and modified images. A common approach involves calculating the squared differences in pixel intensities for each pair of corresponding pixels and then averaging these values across the entire image. The resulting average squared difference is normalized to the overall pixel intensity range to obtain the GDD value. Herein, the GDD was calculated using a multi-step process.

Step 1: For each pixel P where $P(i,j) \in I$ and edge of $I(P(i,j),I) = \text{False}$, find Gray Difference (GD) by $$GD(i,j) = \left(\frac{1}{4}\right) \sum_{i,j} [P(i,j) - P(i',j')]^2$$

where $i', j' \in N_N(j,1)$

Step 2: Find average neighborhood GD for all pixels in I using GDs calculated in step 1, using the following equation $$Avg(GD(i,j)) = \left(\sum_{i=2}^{width(I)-2} \sum_{j=2}^{height(I)-2} GD(i,j)/(width(I) - 2 \times (height(I) - 2))\right)$$

Step 3: Repeat first and second step

Step 4: Finally determine can be determined GDD using equation $$GDD = (Avg_{si}(GD_{si}(i,j)) - Avg(GD(i,j))/Avg_{si}(GD_{si}(i,j)) + Avg(GD(i,j)))$$

A higher GDD value indicates a greater degree of pixel intensity changes between the original and modified images. This suggests that more significant alterations have been introduced by the transformation process. Conversely, a lower GDD value indicates that fewer changes in pixel intensities have occurred, implying a lesser degree of alteration.

Entropy analysis was also performed on the encrypted images produced by the face identification system 100.

Entropy is a measure of randomness or uncertainty in a system. In the context of image processing, entropy quantifies the level of randomness or unpredictability in the pixel intensity values of an image. A higher entropy value indicates greater randomness or unpredictability in the pixel intensity values of the image. This suggests that the image contains a wide range of intensity levels, with no predominant intensity values dominating the distribution. Entropy is commonly used in image processing to characterize the complexity or information content of an image. It provides insights into the diversity and richness of pixel intensity values, which can be useful for tasks such as image compression, segmentation, and classification. A higher entropy value suggests greater diversity and randomness in the pixel intensity values of the image. In other words, the pixel intensities are spread across a wider range of values, and there is less predictability in the distribution of intensity levels.

Entropy values closer to 1 indicate a highly random distribution of pixel intensities, where all intensity levels are equally likely to occur. This implies a more complex and information-rich image. Conversely, lower entropy values indicate a more predictable distribution of pixel intensities, with certain intensity levels dominating the image. This suggests a simpler and less diverse image content. In the present context, an entropy value of 0.7204 was observed for the encrypted image, suggesting a moderate level of randomness in the pixel intensity values and indicating a degree of complexity and diversity in the image content.

Figure 6:
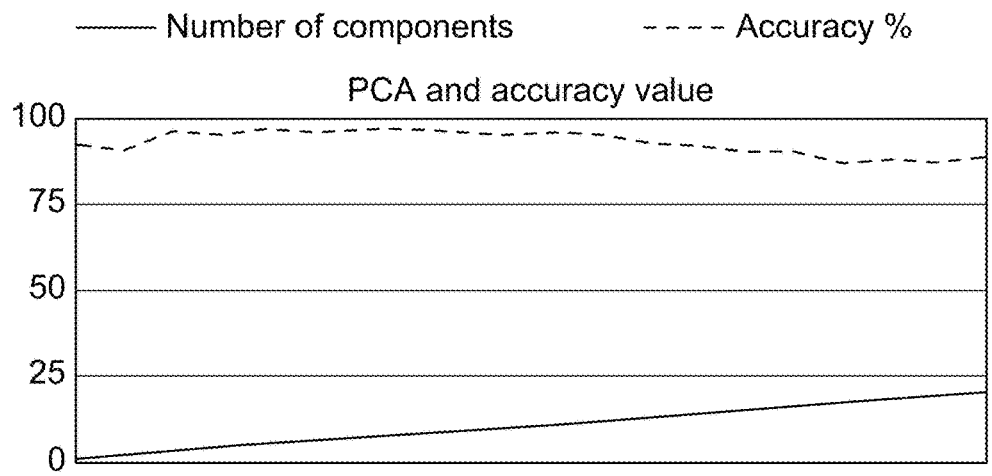
FIG. 6 is an exemplary graph showing relationship between number of principal components used in feature extraction process and resulting accuracy of a face recognition model, according to certain embodiments.

FIG. 6 illustrates a graph depicting the relationship between the number of components used in PCA and the accuracy of the face recognition model. PCA is a dimensionality reduction technique. It is used to reduce the number of features in a data set, which can improve the performance of a machine learning model. The number of components chosen in PCA is a hyperparameter that needs to be regulated. In FIG. 6, the x-axis represents the PCA number of components, ranging from 0 to 20, while the y-axis shows the Accuracy score (%) ranging from 0 to 100. The solid line represents the number of components, and the dashed line represents the accuracy score. The graph demonstrates that the accuracy score generally trends upwards as the number of components increases, though with some fluctuation.

Figure 7A:
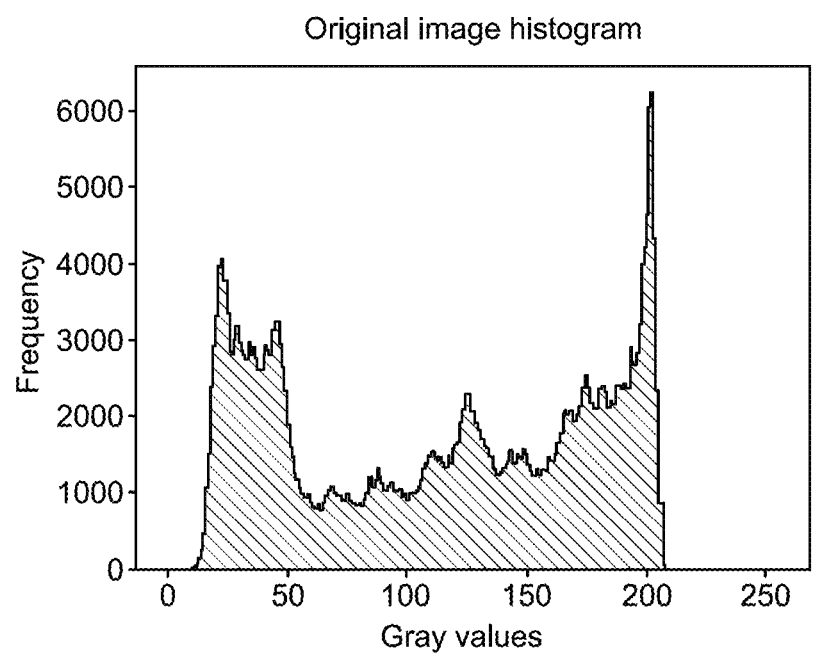
FIG. 7A is an exemplary histogram of pixel intensities for an original facial image before encryption, according to certain embodiments.
Figure 7B:
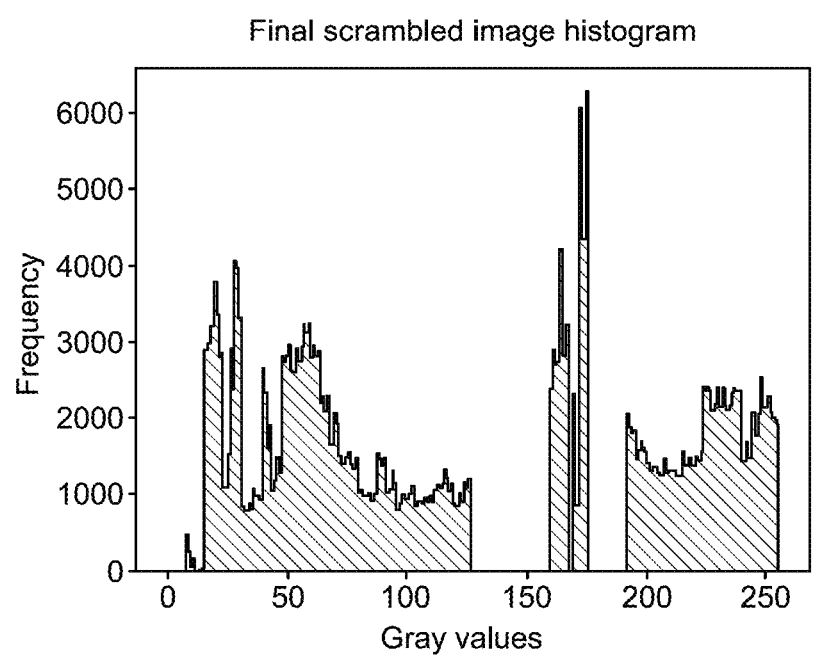
FIG. 7B is an exemplary histogram of pixel intensities for an encrypted facial image after applying the encryption, according to certain embodiments.

FIGS. 7A and 7B present histograms of the original image and the final encrypted image, respectively. These histograms provide a visual representation of the frequency of occurrence of different pixel intensity values within the images. The comparison of these histograms allows for an assessment of how the encryption process alters the distribution of pixel intensities. It may be understood that a successful encryption should transform the non-uniform distribution of the original image into a relatively uniform distribution in the encrypted image. This transformation makes it difficult for an unauthorized party to extract meaningful information or patterns from the encrypted image based on the distribution of pixel intensities alone. The significant difference between the histograms in FIGS. 7A and 7B demonstrates the effectiveness of the encryption process implemented in the face identification system 100. The redistribution of pixel intensities helps to obscure the original image content, enhancing the security of the encrypted facial data.

Figure 8:
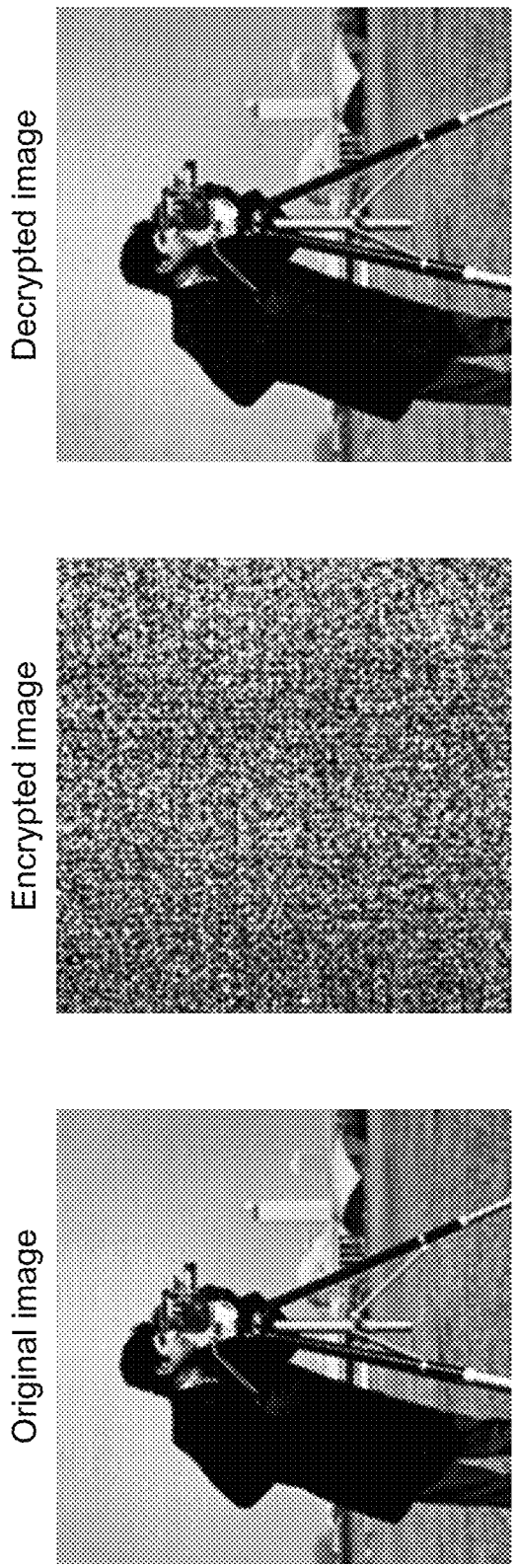
FIG. 8 is an exemplary illustration of a visual comparison of an example image before and after the encryption, according to certain embodiments.
Figure 9:
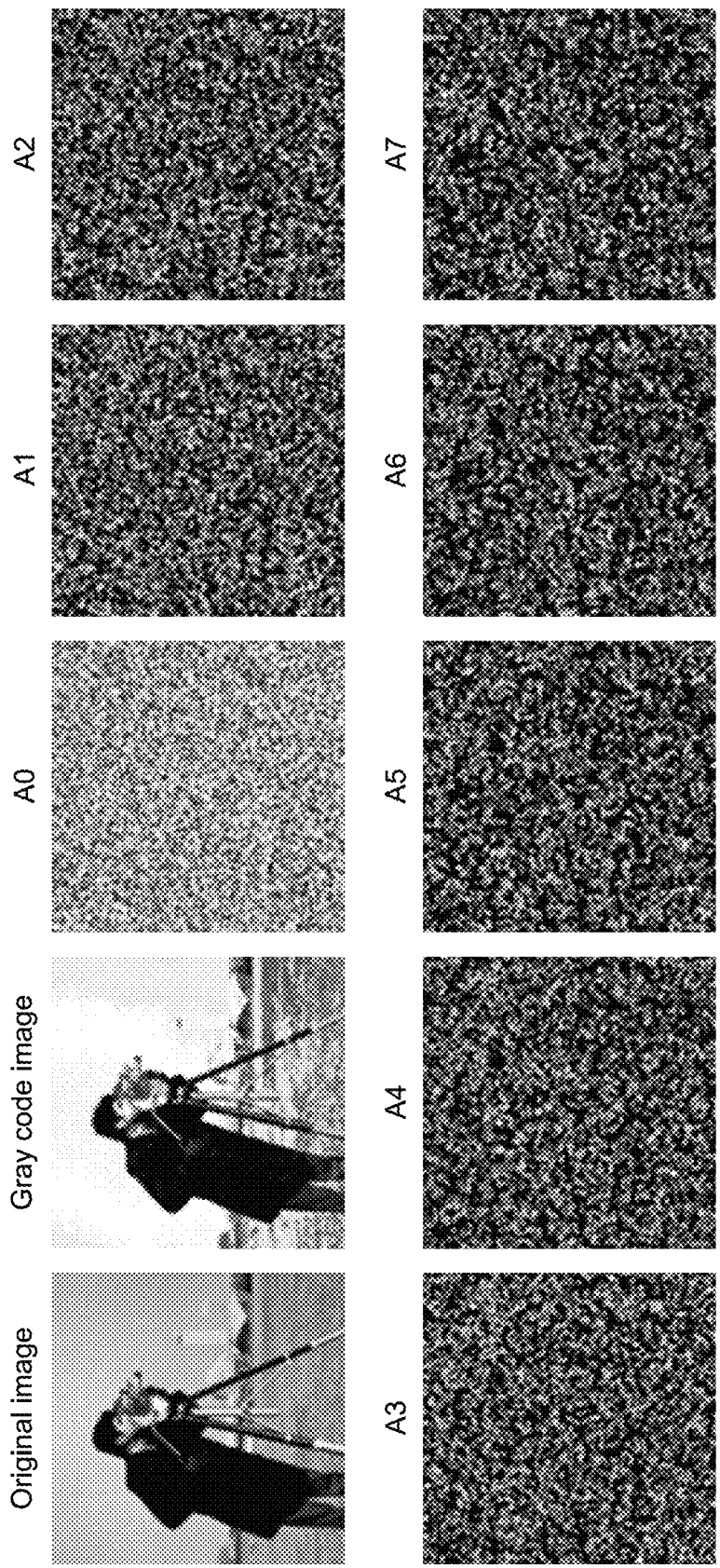
FIG. 9 is an exemplary illustration of stages of image scrambling using cellular automata function, according to certain embodiments.

FIGS. 8 and 9 demonstrate the image encryption process. FIG. 8 shows the "Cameraman" image before and after encryption, while FIG. 9 illustrates the scrambling process using the Game of Life (GOL) cellular automata rules.

The experimental results for the "Cameraman" image, including NPCR (Number of Pixels Change Rate), correlation, GDD, and Entropy values, were as follows:
NPCR: 99.61%
Correlation: 0.0031
GDD: 0.3356
Entropy: 7.9993

These results indicate that the encryption process implemented in the face identification system 100 of the present disclosure achieved a high degree of pixel change (NPCR), low correlation between original and encrypted images, significant gray-level differences (GDD), and high entropy in the encrypted image, all of which are desirable properties for a secure image encryption system. Specifically, the integration of the face identification system with Total External Cellular Automata (TECA)-based grayscale coding represents an approach to image coding with potential implications across various domains. By combining the precision of the face recognition system in identifying facial features with the efficiency of TECA-based grayscale coding, the image compression efficiency and quality is enhanced, particularly for regions of interest such as human faces. The results obtained demonstrates the effectiveness of this integrated approach. The weak correlation between the original and final scrambled images, as indicated by the Pearson correlation coefficient, suggests that the scrambling process successfully disrupts linear relationships between pixel intensities. This implies a high level of security and confidentiality in the encoded images, making them less susceptible to unauthorized access or reverse engineering. Moreover, the high NPCR value obtained indicates a significant alteration between the original and processed images. This indicates an ability of the scrambling process to introduce substantial changes to the image content, further enhancing security and confidentiality. Additionally, the GDD metric highlighted the notable transformation or encryption applied to the image, reinforcing the effectiveness of the modification process. The moderate entropy value observed suggests a degree of complexity and diversity in the image content, further emphasizing the effectiveness of the scrambling process in preserving image quality while ensuring security. Furthermore, the visual comparison of histograms between the original and final scrambled images provide additional context, allowing for a deeper understanding of the impact of the scrambling process on image characteristics. Overall, the results underscore the effectiveness and practicality of integrating the face recognition system with TECA-based grayscale coding in enhancing image coding techniques. This integrated approach provides a balance between image compression efficiency, quality preservation, and security, making it suitable for various applications, including secure communication, digital watermarking, and multimedia content protection.

The face identification system 100 and the method 500 of the present disclosure integrate image coding techniques with advanced face recognition capabilities. The face identification system 100 incorporates a unique combination of TECA, grayscale coding, and chaotic systems to enhance both the security and efficiency of facial image processing and recognition. The face identification system 100 employs an approach to image coding that combines face recognition technology with TECA based on grayscale coding. The combination of these technologies in the face identification system 100 results in improved coding efficiency and accuracy, particularly for images containing human faces. The face identification system 100 utilizes chaotic systems to add an additional layer of security to the coded images, making them more resistant to unauthorized access or attacks. The chaotic nature of the encryption keys used in the face identification system 100 generates highly unpredictable coding patterns, thereby improving the overall robustness of the image coding process.

The face identification system 100 provides several advantages over conventional systems. The multi-stage encryption process provides robust security for facial image data, protecting against unauthorized access and manipulation. The use of cellular automata and gray code techniques introduces complex, chaotic behavior into the encryption process, making it highly resistant to attacks. The feature extraction method based on principal component analysis enables efficient and accurate face recognition, even when working with encrypted image data. This approach allows for dimensionality reduction while preserving the most salient facial features, resulting in improved recognition accuracy and computational efficiency. Furthermore, the ability of the face identification system 100 to perform face recognition on encrypted data enhances privacy protection, as the original facial images need not be decrypted or stored in their unencrypted form at any point in the process.

The GOL is applied after the gray code not before (FIG. 9); first the pixel-bit converter 114 converts these binary values into gray code, then GOL generates and encrypts using a key generated from a chaotic sequence.

The face identification system 100 demonstrates superior computational efficiency compared to traditional image coding and face recognition systems. The optimized integration of TECA and chaotic systems in the face identification system 100 results in reduced processing time for facial image encryption and recognition tasks. In particular, the approach of performing gray coding after the cellular automata further reduces processing time. Additionally, the face identification system 100 makes efficient use of computational resources, making it suitable for real-time applications in various security and access control scenarios. The approach implemented in the face identification system 100 addresses challenges in facial-based authentication, offering a balance of enhanced security, improved accuracy, and computational efficiency. This makes the face identification system 100 suitable for applications across the field of facial recognition technology requiring secure and efficient facial identification. The face identification system 100 is suitable for a wide range of applications, including but not limited to access control systems, security surveillance, personal device authentication, and identity verification for financial transactions.

Figure 10:
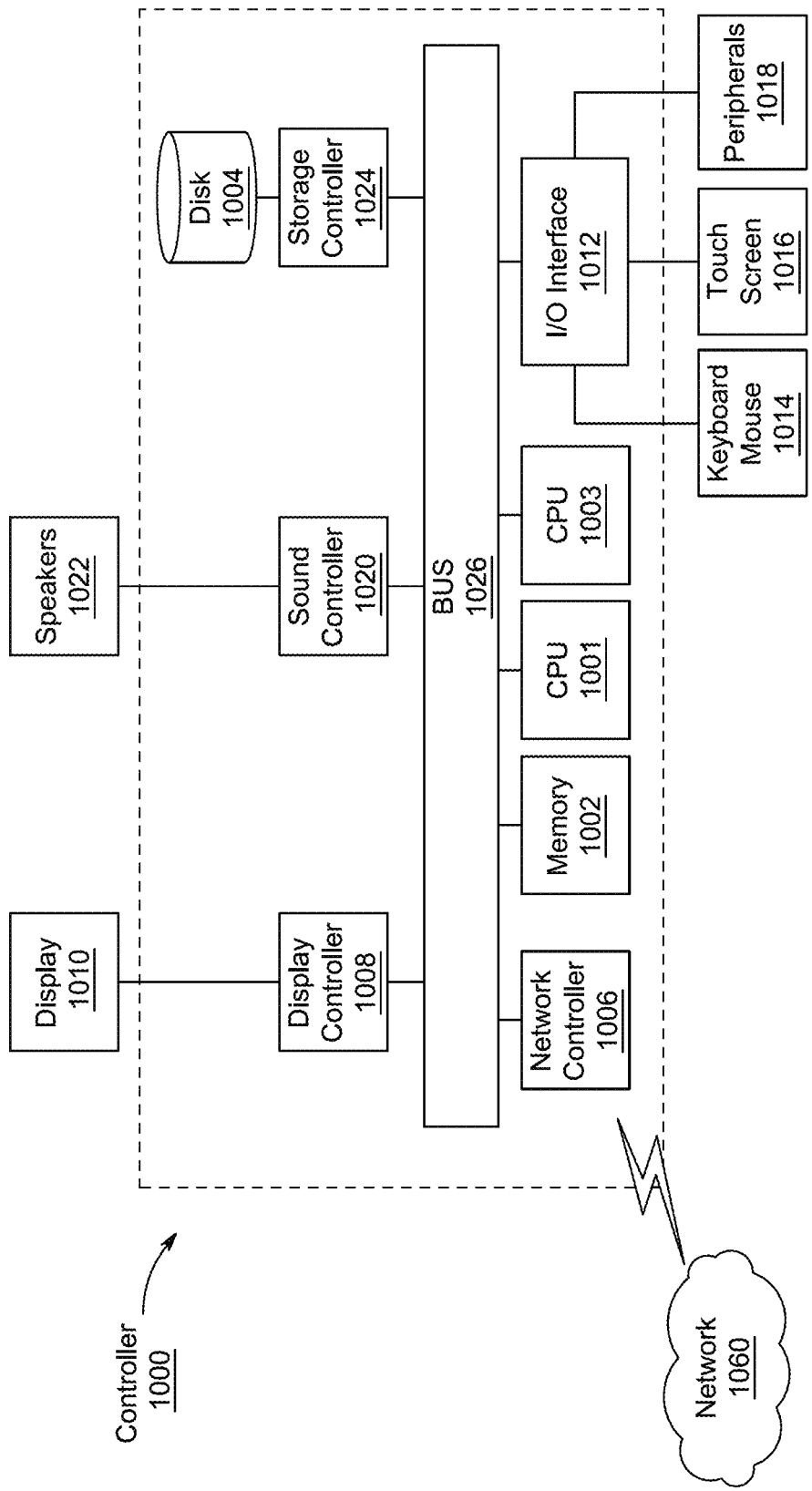
FIG. 10 is an illustration of a non-limiting example of details of computing hardware used in a computer of the face identification system, according to certain embodiments.

Next, further details of the hardware description of a computing environment according to exemplary embodiments is described with reference to FIG. 10. In FIG. 10, a controller 1000 is described is representative of the computer of the face identification system 100, in which the controller 1000 is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the present disclosed method is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosed method may be provided as a utility application, background daemon, or component of an operating system, or combination thereof, executing in conjunction with CPU 1001, 1003 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
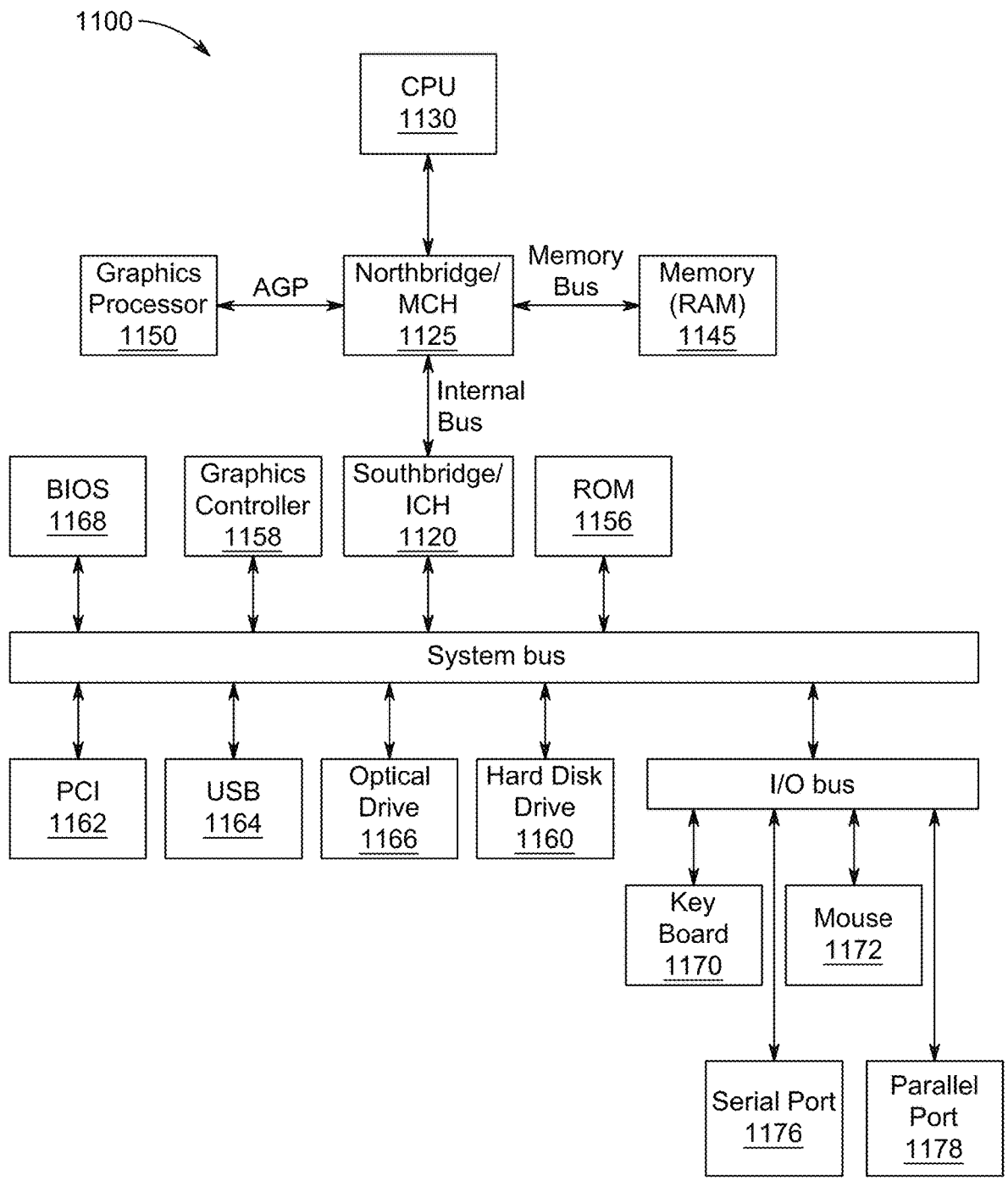
FIG. 11 is an exemplary schematic diagram of a data processing system used within the computer, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
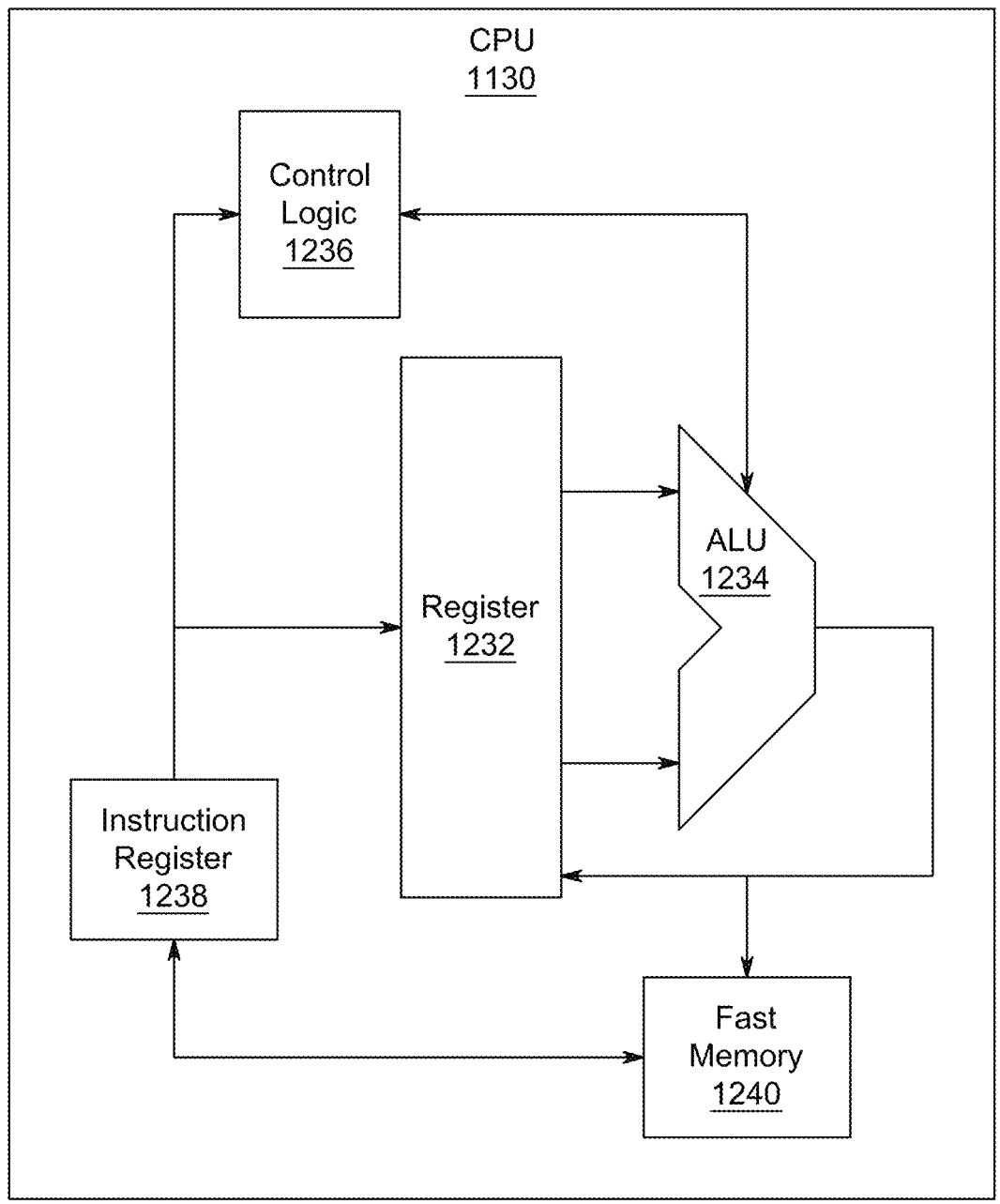
FIG. 12 is an exemplary schematic diagram of a processor used with the computer, according to certain embodiments.

For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1188 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 13:
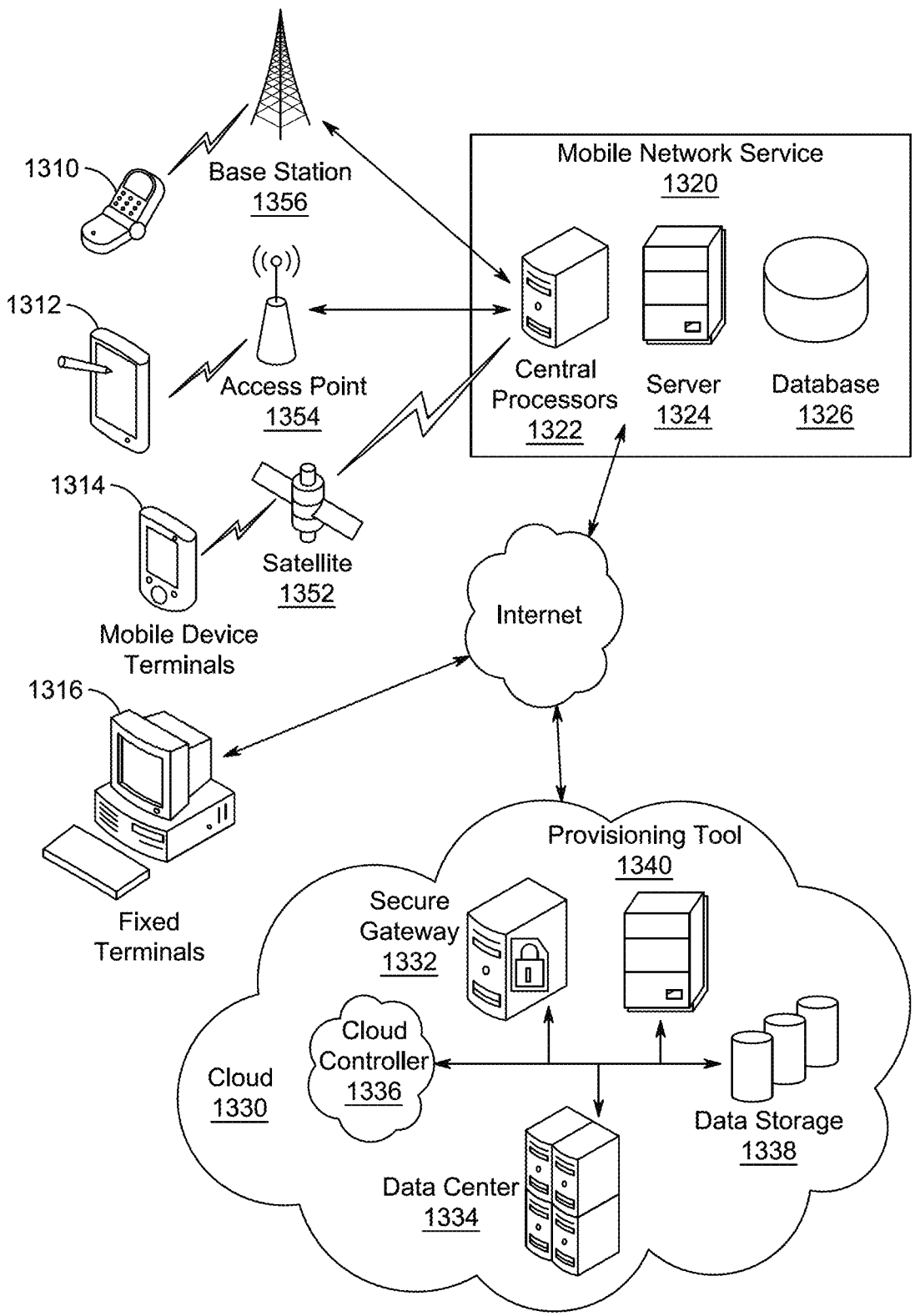
FIG. 13 is an illustration of a non-limiting example of distributed components which may share processing with the computer, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1330 including a cloud controller 1336, a secure gateway 1332, a data center 1334, data storage 1338 and a provisioning tool 1340, and mobile network services 1320 including central processors 1322, a server 1324 and a database 1326, which may share processing, as shown by FIG. 13, in addition to various human interface and communication devices (e.g., display monitors 1316, smart phones 1310, tablets 1312, personal digital assistants (PDAs) 1314). The network may be a private network, such as a LAN, satellite 1352 or WAN 1354, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. For example, different cellular automata rules or encryption algorithms could be employed, or alternative feature extraction and face recognition techniques could be integrated into the system.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A face identification system, comprising:
   a camera for capturing an image of a person's face to obtain a captured facial image;
   encryption circuitry includes a pixel-bit converter, a 2D cellular automata function, and a gray code generator for encrypting the captured facial image to obtain an encrypted facial image;
   wherein:
   the pixel-bit converter transforms each pixel intensity of the captured facial image into binary digits to obtain a binary format of the captured facial image,
   the 2D cellular automata function transforms the binary format of the captured facial image to obtain a transformed binary image output, wherein the 2D cellular automata function works with a 3×3 matrix of cells containing binary numbers, where each binary number is one of two states, the binary numbers are transitioned to next states by update rules, and the gray code generator processes the transformed binary image output by: mapping the binary numbers to unique gray-scale values within a specific range to generate a gray code image, and using an encryption key to apply an encryption algorithm to the generated gray code image to obtain an encrypted image in a gray-scale format, as the encrypted facial image;

feature extraction circuitry for extracting encrypted features from the encrypted facial image;

a face recognition system for identifying the person's face in the encrypted facial image using the extracted encrypted features based on a similarity measure in comparison to an encrypted feature database of known facial features associated with specific individuals; and an identification notifying system for transmitting a notification upon the person's face being identified, the notification including one or more of the person's name, the person's identifier number, and a determination result whether the person is granted an access permission.

2. The face identification system of claim 1, further comprising key generation circuitry configured to generate a chaotic sequence, as the encryption key.

3. The face identification system of claim 2, wherein the key generation circuitry is further configured to generate the chaotic sequence using a logistic map of $$x=r*x*(1-x)$$

where x represents a value of the sequence at an iteration n, r is a parameter between 0 and 4, wherein an initial value of x is 0.5 and r is 3.9.

4. The face identification system of claim 2, wherein the key generation circuitry is further configured to generate random strings of characters as the encryption key.

5. The face identification system of claim 1, wherein the feature extraction circuitry is further configured to extract the features using principal component analysis.

6. The face identification system of claim 1, wherein the 2D cellular automata function uses game of life update rules to transition to next states, including:

if a cell has a value of 0 at time t, it becomes 1 at time t+1, if exactly three neighbor cells are 1 at time t, if a cell is 1 at time t, it becomes 0 at time t+1, if four or more of its neighbor cells are 1 at time t, if a cell is 1 at time t, it becomes 0 at time t+1 if one or none of its neighbor cells are 1 at time 1, if a cell is 1 at time t, it will remain 1 at time t+1 if two or three of its neighbor cells are 1 at time 1.

7. The face identification system of claim 1, wherein the face recognition system is further configured to generate eigenfaces by applying principal component analysis to a dataset of the encrypted feature for face images.

8. The face identification system of claim 1, wherein the face recognition system is further configured to identify a new face image that is projected using principal component analysis.

9. The face identification system of claim 1, wherein the identification notifying system is further configured to transmit a notification that grants or denies access based on the identified face.

10. A non-transitory computer-readable storage medium including computer executable instructions, wherein the instructions, when executed by a computer, cause the computer to perform a method for face identification, comprising:

capturing, by a camera, an image of a person's face to obtain a captured facial image;

encrypting, by encryption circuitry, the captured facial image to obtain an encrypted facial image;

wherein the step of encrypting by the encryption circuitry includes:

transforming each pixel intensity of the captured facial image into binary digits to obtain a binary format of the captured facial image, transforming, by 2D cellular automata, the binary format of the captured facial image to obtain a transformed binary image output, wherein the 2D cellular automata works with a 3×3 matrix of cells containing binary numbers, where each binary number is one of two states, the binary numbers are transitioned to next states by update rules, and processing the transformed binary image output by: mapping the binary numbers to unique gray-scale values within a specific range to generate a gray code image, and using an encryption key to apply an encryption algorithm to the generated gray code image to obtain an encrypted image in a gray-scale format, as the encrypted facial image;

extracting, by feature extraction circuitry, encrypted features from the encrypted facial image;

identifying, by a face recognition system, the person's face in the encrypted facial image using the extracted encrypted features based on a similarity measure in comparison to an encrypted feature database of known facial features associated with specific individuals; and transmitting, by an identification notifying system, a notification upon the person's face being identified, the notification including one or more of the person's name, the person's identifier number, and a determination result whether the person is granted an access permission.

11. The computer-readable storage medium of claim 10, further comprising generating a chaotic sequence, as the encryption key.

12. The computer-readable storage medium of claim 11, further comprising generating the chaotic sequence using a logistic map of $$x=r*x*(1-x)$$

where x represents a value of the sequence at an iteration n, r is a parameter between 0 and 4, wherein an initial value of x is 0.5 and r is 3.9.

13. The computer-readable storage medium of claim 11, further comprising generating random strings of characters as the encryption key.

14. The computer-readable storage medium of claim 10, further comprising extracting the features using principal component analysis.

15. The system of claim 10, further comprising identifying a new face image that is projected using principal component analysis.

16. The system of claim 10, further comprising transmitting a notification that grants or denies access based on the identified face.

* * * * *